(12) United States Patent
McGregor et al.

(10) Patent No.: US 10,360,668 B1
(45) Date of Patent: Jul. 23, 2019

(54) METHODS FOR REQUESTING AND AUTHENTICATING PHOTOGRAPHIC IMAGE DATA

(71) Applicant: TRUEPIC INC., La Jolla, CA (US)

(72) Inventors: Jeffrey McGregor, Palm Springs, CA (US); Craig Stack, La Jolla, CA (US); Jason Lyons, Arlington, VA (US); Matthew Robben, Loveland, OH (US)

(73) Assignee: TruePic Inc., La Jolla, CA (US)

( * ) Notice: Subject to any disclaimer, the term of this patent is extended or adjusted under 35 U.S.C. 154(b) by 0 days.

(21) Appl. No.: 16/101,833

(22) Filed: Aug. 13, 2018

(51) Int. Cl.
| | |
|---|---|
| *G06T 7/00* | (2017.01) |
| *H04N 1/32* | (2006.01) |
| *H04L 9/06* | (2006.01) |
| *G06K 9/62* | (2006.01) |
| *G06F 16/14* | (2019.01) |

(Continued)

(52) U.S. Cl.
CPC .......... *G06T 7/0002* (2013.01); *G06F 16/152* (2019.01); *G06F 16/5838* (2019.01); *G06F 16/5866* (2019.01); *G06K 9/6202* (2013.01); *H04L 9/0637* (2013.01); *H04N 1/32283* (2013.01)

(58) Field of Classification Search
None
See application file for complete search history.

(56) References Cited

U.S. PATENT DOCUMENTS

| | | |
|---|---|---|
| 5,351,134 A | 9/1994 | Yaguchi |
| 6,411,725 B1 | 6/2002 | Rhoads |

(Continued)

FOREIGN PATENT DOCUMENTS

| | | |
|---|---|---|
| WO | 0227431 A2 | 4/2002 |
| WO | 2015020601 A1 | 2/2015 |
| WO | 2017023896 | 2/2017 |

OTHER PUBLICATIONS

Bhowmik, Deepayan, and Tian Feng. "The multimedia blockchain: A distributed and tamper-proof media transaction framework." Digital Signal Processing (DSP), 2017 22nd International Conference on. IEEE, 2017. 6 pages (Year: 2017).*

(Continued)

*Primary Examiner* — Ryan P Potts
(74) *Attorney, Agent, or Firm* — Sheppard Mullin Richter & Hampton LLP

(57) ABSTRACT

A system and method include obtaining and authenticating image files from users, such as insured users, at the request of an entity, such as an insurance provider. The requesting entity may supply an electronic address of the user and a unique identifier. The system may transmit a link to the electronic address. When selected, the link causes an image authentication application to be installed on a user device. The application takes the images securely and separately from a native camera application. Each image authentication application may be customized for each requesting entity. An authentication server may identify the requesting entity that made the request and identify a corresponding image authentication application to be provided to the electronic address. The images from the image authentication application may be authenticated via reverse image search, time, geolocation, and/or other information. The authenticated images and/or related data may be provided to the requesting entity.

28 Claims, 17 Drawing Sheets

(51) Int. Cl.
*G06F 16/583* (2019.01)
*G06F 16/58* (2019.01)

(56) References Cited

U.S. PATENT DOCUMENTS

| | | |
|---|---|---|
| 6,487,301 B1 | 11/2002 | Zhao |
| 6,557,102 B1 | 4/2003 | Wong |
| 6,628,417 B1 | 9/2003 | Naito |
| 6,947,571 B1 | 9/2005 | Rhoads |
| 7,209,571 B2 | 4/2007 | Davis |
| 7,616,777 B2 | 11/2009 | Rodriguez |
| 8,121,342 B2 | 2/2012 | Davis |
| 8,413,882 B1 | 4/2013 | Nidamarthi |
| 8,849,819 B2 | 9/2014 | Johnson |
| 8,868,039 B2 | 10/2014 | Rodriguez |
| 8,955,137 B2 * | 2/2015 | Mousty ............... H04L 63/1408 726/24 |
| 9,002,719 B2 * | 4/2015 | Tofte ...................... G06Q 40/08 705/4 |
| 9,300,678 B1 | 3/2016 | Stack |
| 9,614,886 B2 | 4/2017 | Zhong |
| 9,621,565 B2 | 4/2017 | Stack |
| 9,652,460 B1 | 5/2017 | Barisic |
| 9,832,017 B2 | 11/2017 | Malone |
| 10,013,568 B2 | 7/2018 | Mityagin |
| 2003/0065922 A1 | 4/2003 | Fredlund |
| 2004/0039912 A1 | 2/2004 | Borrowman |
| 2004/0091111 A1 | 5/2004 | Levy |
| 2004/0153649 A1 | 8/2004 | Rhoads |
| 2006/0018506 A1 | 1/2006 | Rodriguez |
| 2006/0036864 A1 | 2/2006 | Parulski |
| 2006/0115111 A1 | 6/2006 | Malone |
| 2006/0120562 A1 | 6/2006 | Fudge |
| 2006/0157559 A1 | 7/2006 | Levy |
| 2007/0019836 A1 | 1/2007 | Thorwirth |
| 2007/0091376 A1 | 4/2007 | Calhoon |
| 2007/0162756 A1 | 7/2007 | Fredlund |
| 2007/0171288 A1 | 7/2007 | Inoue |
| 2009/0044235 A1 | 2/2009 | Davidson |
| 2009/0320101 A1 | 12/2009 | Doyle |
| 2010/0046748 A1 | 2/2010 | Kusnoto |
| 2010/0250953 A1 | 9/2010 | Wiersma |
| 2010/0281475 A1 * | 11/2010 | Jain ........................ G06F 8/658 717/172 |
| 2010/0317399 A1 | 12/2010 | Rodriguez |
| 2011/0087690 A1 | 4/2011 | Cairns |
| 2011/0156879 A1 | 6/2011 | Matsushita |
| 2011/0231645 A1 | 9/2011 | Thomas |
| 2012/0143630 A1 * | 6/2012 | Hertenstein ............ G06Q 40/08 705/4 |
| 2012/0311623 A1 | 12/2012 | Davis |
| 2013/0041948 A1 | 2/2013 | Tseng |
| 2014/0049653 A1 | 2/2014 | Leonard |
| 2014/0081932 A1 | 3/2014 | Krislov |
| 2014/0198687 A1 | 7/2014 | Raleigh |
| 2014/0244781 A1 | 8/2014 | Klayko |
| 2014/0279493 A1 | 9/2014 | Kamath |
| 2014/0297810 A1 | 10/2014 | Zhong |
| 2014/0324986 A1 | 10/2014 | Zhang |
| 2014/0358964 A1 | 12/2014 | Woods |
| 2015/0016661 A1 | 1/2015 | Lord |
| 2015/0142595 A1 | 5/2015 | Acuna-Rohter |
| 2015/0154436 A1 | 6/2015 | Shi |
| 2015/0213324 A1 | 7/2015 | Farid |
| 2016/0379330 A1 | 12/2016 | Powers |
| 2017/0041306 A1 | 2/2017 | Stack |
| 2017/0041328 A1 | 2/2017 | Stack |
| 2017/0048216 A1 * | 2/2017 | Chow ................ G06Q 20/0655 |
| 2017/0118493 A1 | 4/2017 | Hain |
| 2017/0180277 A1 | 6/2017 | Brady |
| 2017/0193329 A1 * | 7/2017 | Suman ................ G06K 9/6215 |
| 2017/0295232 A1 | 10/2017 | Curtis |
| 2017/0373859 A1 * | 12/2017 | Shors ...................... G09C 5/00 |
| 2017/0374622 A1 | 12/2017 | Visuri |
| 2018/0026932 A1 | 1/2018 | Wang |
| 2018/0260888 A1 | 9/2018 | Paolini-Subramanya |

OTHER PUBLICATIONS

Drescher, D. Blockchain basics: a non-technical introduction in 25 steps, 255 pages, APress. ISBN 978-1-4842-2603-2, 2017. 246 pages (Year: 2017).*
International Patent Application No. PCT/US2016/045089, an International Search Report and Written Opinion issued by Authorized Officer Lee W. Young, dated Oct. 21, 2016, 8 pages.
The TCP/IP Guide, tcpipguide.com, 2005, pp. 1-4.
European Patent Application No. 16833714.5, Supplementary European Search Report, dated Nov. 13, 2018, 7 pages.
International Patent Application No. PCT/US2018/053059, an International Search Report and Written Opinion issued by Authorized Officer Lee W. Young, dated Dec. 10, 2018, 13 pages.

* cited by examiner

METHODS FOR REQUESTING AND AUTHENTICATING PHOTOGRAPHIC IMAGE DATA

CROSS-REFERENCE TO RELATED APPLICATIONS

This application is related to co-pending U.S. patent application Ser. No. 16/101,819, entitled "PROOF OF IMAGE AUTHENTICATION ON A BLOCKCHAIN", filed on Aug. 13, 2018, the contents of which are hereby incorporated by reference in its entirety herein.

TECHNICAL FIELD

The present disclosure relates to systems and methods for authenticating images responsive to requests from entities that wish to obtain authenticated images from its users, including providing a customized image authentication application of the requesting entity for controlling photography on a user device and metadata associated therewith and an authentication server for receiving data therefrom.

BACKGROUND

Digital photography has grown steadily since its introduction. Social networks and mobile computing devices have further accelerated the growth of photographic data made available to the public. The ability to take and share photographs anytime and anywhere has resulted in the general public consuming more photographic data than ever and relying on these photographs for up to the minute information. However, it is a well-known fact that digital photographs are easily edited and the information contained within a digital photograph may not be entirely trustworthy. Thus, obtaining trustworthy evidence based on digital photographs and other electronic images (also referred to herein interchangeably as "images") can be challenging due to the use of technology that can alter and compromise the integrity of such images. These and other problems exist with conventional image collection and authentication systems.

Authenticated photos can be used in many situations, particularly where the photo is used as evidence or proof of some fact or set of facts. Various industries deal with technical challenges around remote or virtual underwriting and inspections. Traditionally an inspection required a trusted human inspector to go view a property, business, or asset in person. This is costly and time consuming.

The use of technology has enabled remote or virtual inspections. However, this technical solution has led to other issues. One common issues with using images (photos or video) to facilitate a remote or virtual inspection is that many technologies exists that enable images, their location data and other metadata to be easily altered.

One such example is in the context of insurance claims, various applications and technologies exist that enable an unscrupulous user to engage in metadata manipulation, location spoofing, photo editing & manipulation, capturing photos of other photos and simply using images from the Internet that purport to be images captured by the user. All of these technical problems can adversely impact the integrity of an underwriting or claims process.

These and other technical problems exist across many industries and in many contexts where image data is submitted in lieu of an in-person physical inspection.

SUMMARY

The invention provides a technical solution to overcome these and other issues that arise in connection with the use of technology for remote or virtual inspections which rely at least in part on images to evidence or document some fact or set of facts.

According to one aspect, the disclosure relates to obtaining one or more images from a user and authenticating the images responsive to a request from an entity to do so. For instance, the requesting entity may include an insurance provider that wishes to obtain and authenticate images relating to an insurance claim (e.g., images that document damage to a vehicle) from an insured user. To prevent image tampering or other fraudulent image uploads, the system may provide the user with an image authentication application to be installed on a user device that takes the images securely and separately from a native camera application of that user device.

In some implementations, each image authentication application may be customized for each requesting entity. For example, the image authentication application may be white-labeled for each requesting entity. In these implementations, the authentication server may identify the requesting entity that made the request and identify a corresponding image authentication application to be provided to the electronic address of the user. The image authentication application may include information associated with the requesting entity, e.g., a unique identifier associated with the requesting entity and/or other customize content and/or functionality specific to the requesting entity.

The insurance provider may transmit the request to the authentication server to obtain and authenticate images from the insured. The request may be transmitted via a portal user interface ("UI"), provided by the authentication server, through which a requesting device (e.g., a device of the requesting entity) may request secure and authenticated images from a user device (e.g., a device used by an insured). The portal UI may include one or more user input options for receiving one or more request parameters that specify the request for the secure and authenticated images. For instance, via the one or more user input options, the portal UI may receive a name of a user (e.g., person or entity) from which the images are ultimately being requesting, an electronic address of the user, a client-generated identifier (such as an insurance claim number), an expected location of the user (e.g., a home or work address), a note for the user, and/or other information for requesting the secure and authenticated images.

The authentication server may identify a white-labeled image authentication application for the requesting entity based on the request. The authentication server may generate one or more link parameters for generating a link for transmission to the electronic address of the user. The link when selected at a user device may cause the user device to download the image authentication application. The link parameters may include an electronic location from which to download an image authentication application, a unique identifier, and/or other information. In some instances, the link parameters may be based on one or more of the request parameters. For instance, the unique identifier may include the client-generated identifier. In other instances, the unique identifier may be generated by the authentication server to track the request.

The authentication server may generate a link based on the link parameters. The link may encode the electronic location from which to download the image authentication application and the unique identifier. In some instances, the authentication server may generate the link using a third party or internal link generation service that encodes the link as a bitly code or tinyURL. Other forms of linking may be used as well.

The authentication server may transmit the link to the electronic address specified in the request. For instance, the authentication server may generate a message that includes the link and transmit the message via an appropriate communication channel. If the electronic address is a mobile phone number, the authentication server may transmit the message via a Short Message Service ("SMS") or Multimedia Messaging Service ("MMS") text message. If the electronic address is a mobile phone number, the user device may include a mobile phone that displays the message having the link as a text message. The message may invite the user of the user device to select or otherwise interact with the link to download the image authentication application. If the electronic address is an e-mail address, the authentication server may transmit the message via electronic mail. Other types of electronic communication may be used to transmit the message depending on the type of the electronic address.

The user device may receive the link and download the image authentication application. The image authentication application may be downloaded (as specified in the link) from an electronic location, such as from an app store. The app store may include a third party app store or an internal app store provided by the authentication server.

The user device may install the image authentication application. If the image authentication application is already installed on the user device (such as when the user device has previously received a link for the image authentication application for submitting images from a prior accident), the user device may open the installed image authentication application with a parameter that specifies the unique identifier so that instead of the previous context, the image authentication application opens with a new request to provide new images.

In some instances, the user device may automatically, without user intervention, open the image authentication application or may open the image authentication application responsive to a user input to do so (such as by selecting an icon corresponding to the application). The image authentication application may include the unique identifier, which was encoded in the link. For instance, the image authentication application may store the unique identifier in a hidden form field for submission to the authentication server. Other ways to store and transmit the unique identifier may be used as well. In some implementations, the image authentication application may store the unique identifier without intervention by the user at the user device. Thus, in these implementations, the user may not be required to register to use the image authentication application—upon download and installation, the image authentication application may be used to generate one or more electronic images for authentication.

The image authentication application may prompt the user to take appropriate images for authentication and upload to the authentication server. For example, the image authentication application may prompt the user to take pictures, video, or other images to document proof of damage to an insured property. In some instances, the unique identifier may be associated with a particular type of inspection in which instructions for taking providing specific images may be requested. For example, a car insurance claim may require a certain number and/or focus area of images be taken. An adjuster may require, for instance, a certain number of pictures be taken of the damaged areas. These and other parameters may be stored in association with the unique identifier. When the image authentication application is opened, it may consult with the authentication server to obtain the parameters specific to the type of inspection and/or specific to the particular inspection. The authentication server may transmit the parameters to the image authentication application, which applies the parameters to request certain images. For instance, the parameters may specify that a certain number of images be taken at particular angles, in which case the image authentication application may require that the required number of images be taken. In these examples, the image authentication application may continue operation until the appropriate number of images are taken. The parameters may specify other requirements apart from the number of images. For example, the parameters may specify certain angles, zoom level, and/or other requirements for the images that the image authentication application applied when requesting the user to take images.

The user device may generate and transmit the one or more electronic images and/or related data (such as a hash of an electronic image, metadata such as EXIF or similar data) to the authentication server. For example, if an available network connection should not be used because it is low quality or the user does not wish to use network bandwidth via a cellular connection (or other reason), the image authentication application may send only the hash file of each image taken. The image authentication application may then provide the one or more images.

The authentication server may authenticate the one or more images. Such authentication may include, among other things, performing a reverse image search for each of the one or more electronic images using image platform. For example, each of the one or electronic images may be matched against a database of electronic images to determine whether a match exists. Such comparisons may include generating a hash of the image (and/or using the hash provided by the image authentication application executing at user device) to be searched and comparing the hash against the hash of each image in the database of electronic images. A match between the hashes may indicate that the electronic image uploaded from the user device is one that already exists, suggesting that the image is not authentic. For example, the image could be an existing image that was taken by the image authentication application or copied from an online search and uploaded (assuming that the image authentication application could have been tampered with to do so).

Other methods of authentication may be performed as well or in the alternative. For instance, the image authentication application may transmit metadata to the authentication server that can be used for authentication. The metadata may include or indicate various time, geolocation, and/or other information that can be used to authenticate the images. For instance, the metadata may include a time and/or location at which the image authentication application was downloaded, installed, opened, used to generate images, and used to upload images. The foregoing may be used to how much time has passed or distance was travelled between various events of interest. For example, if the time from application installation to taking a picture deviates from a predefined threshold amount of time, the picture may not be authenticated. This is because the user may have had time to compromise the picture and/or the application. In some instances, the user's location derived from the metadata may be compared to an expected location such as a home or work location, which may be supplied by the requesting entity such as the insurance company. If the distance between the user location and expected location deviates from a predefined distance, then the picture may not be authenticated.

The authentication server may provide the one or more electronic images, any associated metadata, indication of authentication (or failed authentication and reason for failure), the unique identifier, and/or other information through the portal UI. In this manner, the requesting device may obtain the one or more electronic images, which (may) have been authenticated.

In some instance, various processes described herein may generate a transaction to be transmitted to a blockchain network. The transaction may be written as a block to the decentralized ledger. For instance, the image authentication application may generate and transmit a transaction each time an image is taken, uploaded, and/or at other times. The authentication server may generate and transmit a transaction each time the image is received, authenticated, and/or at other times. The transaction's payload may include a hash of an image generated at the image authentication application. In this manner, an immutable record of the image at various stages or processes may be recorded in the decentralized ledger. For example, the hash of an image at the time of generation, upload, authentication, and/or at other times may be retrieved from the decentralized ledger and compared with one another to verify that a corresponding image has not been tampered with throughout these processes.

Although the preceding and other examples used throughout may refer to an insurer requesting authenticated images from its insured, the system may be used in other contexts in which an entity wishes to obtain images from users for authentication.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

According to one aspect, various disclosed systems and methods may authenticate images based on requests from entities to obtain and authenticate electronic images from users. For instance, an entity may include an insurance provider that wishes for its insured to generate and upload images relating to an insurance claim (e.g., images that document damage to a vehicle). The system may mitigate fraudulent claims in various ways, such as by providing the user with a dedicated application to be installed on a user device. For example, the insurance provider may generate a request to obtain images from its insured to the authentication server. The request may include an electronic address of its insured. The authentication server may provide a link to the electronic address. The link may include a network location from which to download the application and a unique identifier associated with the request. Upon selection of the link by the insured, the user device of the insured may download the application. The application, which is separate from a native camera application, may generate one or more images and transmit the images, along with the unique identifier, to an authentication server to prevent tampering. The authentication server may authenticate the image by comparing it to a database of known images. For instance, the authentication server may execute a reverse image search on the image. The authentication server may authenticate the image in alternative or additional ways as well. Because the images were provided with the unique identifier, the authentication server may provide the images, any metadata accompanying the images, results of authentication, and/or other information to the insurer.

Figure 1:
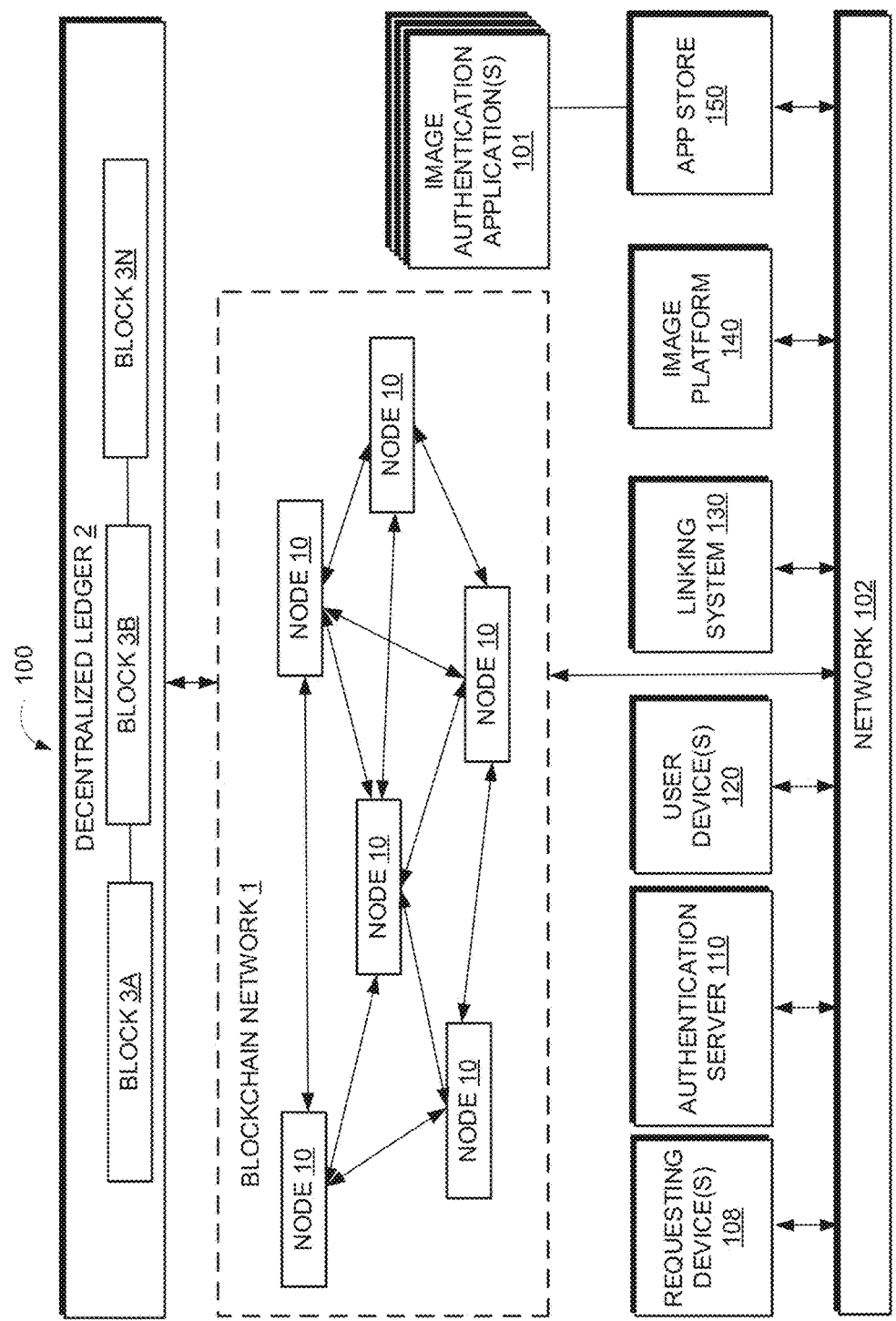
FIG. 1 illustrates a system of authenticating electronic images, according to an implementation of the invention.

FIG. 1 illustrates a system 100 of authenticating electronic images, according to an implementation of the invention. System 100 may include an authentication server 110, one or more user devices 120, a linking system 130, an image platform 140, an app store 150, a blockchain network 1 composed of multiple nodes 10, a decentralized ledger 2 composed of multiple blocks 3, and/or other components. The components of system 100 may be in communication with one another via a network 102.

Figure 2:
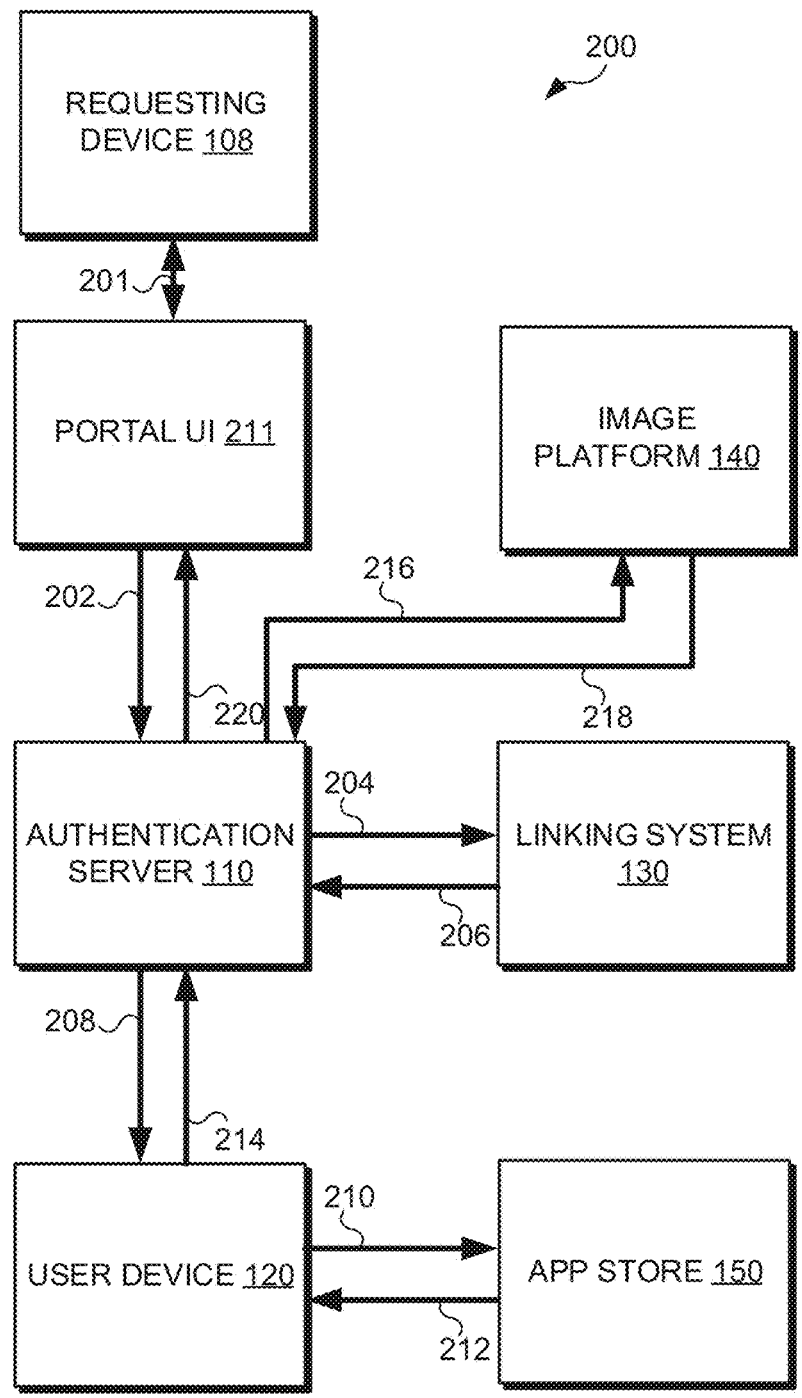
FIG. 2 illustrates a data flow diagram for a system of authenticating electronic images, according to an implementation of the invention.

Reference will now be made to FIG. 2, which illustrates a data flow diagram 200 for the system 100 of authenticating electronic images, according to an implementation of the invention. The authentication server 110 may generate a portal user interface ("UP") 201 through which the requesting device 108 may request secure and authenticated images from the user device 120 via the authentication server. The portal UI 211 may include one or more user input options for receiving one or more request parameters that specify the request for the secure and authenticated images. For instance, via the one or more user input options, at an operation 201, the portal UI 211 may receive a name of a user (e.g., person or entity) from which the images are ultimately being requesting, an electronic address of the user, a client-generated identifier (such as an insurance claim number), an expected location of the user (e.g., a home or work address), a note for the user, and/or other information for requesting the secure and authenticated images.

At an operation 202, the portal UI 211 may receive the request parameters and forward them to the authentication server 110.

At an operation 204, the authentication server 110 may generate one or more link parameters and provide them to the linking system 130 for generation of a link for transmission to the electronic address of the user. The link parameters may include an electronic location from which to download an image authentication application 101, a unique identifier, and/or other information. In some instances, the link parameters may be based on one or more of the request parameters. For instance, the unique identifier may include the client-generated identifier. In other instances, the unique identifier may be generated by the authentication server 110 to track the request. In some implementations, each image authentication application 101 may be customized for each requesting entity. For example, the image authentication application 101 may be white-labeled for each requesting entity. In these implementations, the authentication server 110 may identify the requesting entity that made the request and identify a corresponding image authentication application 101 (such as one that has been white-labeled for the requesting entity) to be provided to the electronic address of the user. In other implementations, the image authentication application 101 may include a single application. The single application may customize its content (including look-and-feel) based on the unique identifier. For instance, each unique identifier may be associated with a corresponding requesting entity, which is then used to provide custom content based on the identity of the requesting entity.

At an operation 206, the linking system 130 may generate a link based on the link parameters. The link may encode the electronic location from which to download the image authentication application 101 and the unique identifier.

At an operation 208, the authentication server 110 may transmit the link to the electronic address. For instance, the authentication server 110 may generate a message that includes the link and transmit the message via an appropriate communication channel. If the electronic address is a mobile phone number, the authentication server 110 may transmit the message via a Short Message Service ("SMS") or Multimedia Messaging Service ("MMS") text message. If the electronic address is an e-mail address, the authentication server 110 may transmit the message via electronic mail. Other types of electronic communication may be used to transmit the message depending on the type of the electronic address.

At an operation 210, the user device 120 may receive the link and download the image authentication application 101, such as from the app store 150. The app store 150 may include a third party app store such as GOOGLE PLAY or APPLE APP STORE. The app store 150 may include an internal app store provided by the authentication server 110.

If the electronic address is a mobile phone number, the user device 120 may include a mobile phone that displays the message having the link as a text message. The message may invite the user of the user device 120 to select or otherwise interact with the link to download the image authentication application 101.

At an operation 212, the app store 150 may identify the image authentication application 101 based on the link and may transmit it to the user device 120. For instance, the app store 150 may store multiple image authentication applications 101, each white-labeled for a respective entity. The user device 120 may download and install. The foregoing may be performed automatically without user intervention, other than any confirmation to download the application. In some instances, the user device 120 may automatically open the image authentication application 101 or may open the image authentication application 101 responsive to a user input to do so (such as by selecting an icon corresponding to the application. The image authentication application 101 may include the unique identifier encoded in the link. For instance, the image authentication application 101 may store the unique identifier in a hidden form field for submission to the authentication server 110. Other ways to store and transmit the unique identifier may be used as well. In some implementations, the image authentication application 101 may store the unique identifier without intervention by the user at the user device 120. Thus, in these implementations, the user may not be required to register to use the image authentication application 101—upon download and installation, the image authentication application 101 may be used to generate one or more electronic images for authentication.

At an operation 214, the user device 120 may generate and transmit the one or more electronic images and/or related data (such as a hash of an electronic image, metadata such as EXIF or similar data) to the authentication server 110.

At an operation 216, the authentication server 110 may authenticate the one or more images. Such authentication may include, among other things, performing a reverse image search for each of the one or more electronic images using image platform 140. For example, each of the one or electronic images may be matched against a database of electronic images to determine whether a match exists. Such comparisons may include generating a hash of the image (and/or using the hash provided by the image authentication application 101 executing at user device 120) to be searched and comparing the hash against the hash of each image in the database of electronic images. A match between the hashes may indicate that the electronic image uploaded from the user device 120 is one that already exists, suggesting that the image is not authentic. For example, the image could be an existing image that was taken by the image authentication application 101 or copied from an online search and uploaded (assuming that the image authentication application 101 could have been tampered with to do so).

At an operation 218, the image authentication server 110 may obtain results of the reverse image search from the image platform 140. Other methods of authentication may be performed as well or in the alternative, such as comparing metadata indicating location at which the image was generated with an expected location (e.g., comparing the location of where the image was taken with a home or other address/location of the user), comparing a time at which the image authentication application 101 was downloaded and a time at which an image was taken or uploaded to the authentication server 110, comparing a time at which an image was taken with a time at which the image was uploaded to the authentication server 110, comparing a time at which the image authentication application 101 was opened and the time at which an image was taken, comparing a time at which the image authentication application 101 was opened and the time at which an image was uploaded, comparing a location at which the image authentication application 101 was downloaded and a location at which an image was taken or uploaded to the authentication server 110, comparing a location at which an image was taken with a location at which the image was uploaded to the authentication server 110, comparing a location at which the image authentication application 101 was opened and the location at which an image was taken, comparing a location at which the image authentication application 101 was opened and the location at which an image was uploaded, and/or other validation techniques. The foregoing time and/or geographic requirements help to ensure that the user has not had sufficient time to edit the image file.

At an operation 220, the authentication server 110 may provide the one or more electronic images, any associated metadata, indication of authentication (or failed authentication and reason for failure), the unique identifier, and/or other information through the portal UI 201. In this manner, the requesting device 208 may obtain the one or more electronic images, which have been authenticated. Although not illustrated, any or all of the information may be written to the decentralized ledger 2 for immutable storage and authentication.

Referring back to FIG. 1, the blockchain network 1 may be composed of multiple nodes 10. At least some of the nodes may include its own copy of the decentralized ledger 2. The decentralized ledger 2 may be composed of multiple blocks 3 that each refer to a prior block's hash. Various processes described herein, through a blockchain agent 322, may generate a transaction to be transmitted to the blockchain network 1 (e.g., to one or more nodes via peer-to-peer communication protocol). The transaction may be written as a block 3 to the decentralized ledger 2. For instance, the image authentication application 101 may generate and transmit a transaction each time an image is taken, uploaded, and/or at other times. The authentication server 110 may generate and transmit a transaction each time the image is received, authenticated, and/or at other times. The transaction's payload may include a hash of an image generated at the image authentication application 101. In this manner, an immutable record of the image at various stages or processes may be recorded. For example, the hash of an image at the time of generation, upload, authentication, and/or at other times may be retrieved from the decentralized ledger 2 and compared with one another to verify that a corresponding image has not been tampered with throughout these processes.

Figure 3:
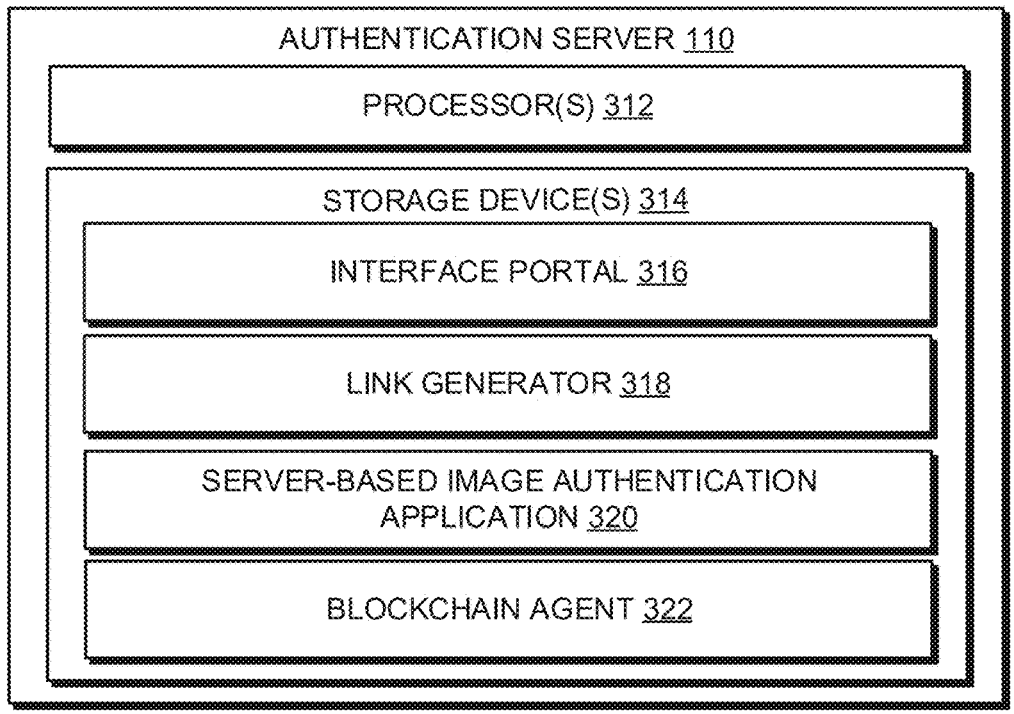
FIG. 3 illustrates an authentication server for authenticating images captured at and provided by a user device, according to an implementation of the invention.

FIG. 3 illustrates an authentication server 110 for authenticating images captured at and provided by a user device 120, according to an implementation of the invention. The authentication server 110 may include one or more physical processors 312, one or more storage devices 314, and/or other components. The one or more storage devices 314 may store instructions that programs the one or more physical processors 312. For instance, the one or more storage devices 314 may store an interface portal 316, a link generator 318, a server-based image authentication application 320, a blockchain agent 322, and/or other components that program the processors 312 (and therefore authentication server 110).

The interface portal 316 may generate one or more interfaces for receiving requests to obtain authenticated images from users. For example, the interface portal 316 may generate the portal UI 211. In some instances, the interface portal 316 may implement one or more layers of authentication. For instance, the authentication server 110 may have previously registered clients to use the system to request authenticated images from users. The clients may register one or more of their requesting devices 108 or network gateway. For example, the system may store valid Internet Protocol ("IP") addresses associated with registered clients. As such, the interface portal 316 may whitelist IP addresses so that an IP address of requesting device 108 may be compared with previously registered, whitelisted, IP addresses. Other layers of authentication such as secret key/password and/or other authentication mechanisms may be used as well.

The portal UI 211 may include one or more user input options for receiving one or more request parameters that specify the request for the secure and authenticated images. For instance, via the one or more user input options may be configured to receive a name of a user (e.g., person or entity) from which the images are ultimately being requesting, an electronic address of the user, a client-generated identifier (such as an insurance claim number), an expected location of the user (e.g., a home or work address), a note for the user, and/or other information for requesting the secure and authenticated images.

In some instances, the client-generated identifier may be stored in association with a user logon used for authentication. For example, an entity such as an insurance provider may employ multiple claim personnel to handle insurance claims identified by a claim number (which may serve as the client-generated identifier). Upon login by the claim personnel, the portal UI 211 may present the insurance personnel with claim numbers being handled by that person. Upon selection of a claim number, relevant authenticated images and/or other information collected or analyzed by the system may be presented for display and/or download through the portal UI 211.

Responsive to the request to obtain authentication images, the link generator 318 may identify the entity making the request. The requesting entity's specific white-labeled image authentication application 101 may be identified based on the requesting entity's identity. The link generator 318 may encode the link based on a download location for the white-labeled image authentication application 101 and a unique identifier, which may be the client-generated identifier or a system-generated identifier. In either case, the client-generated identifier or the system-generated identifier may be stored in association with the request parameters. In some instances, the link may be generated as a bitly code or tinyURL, which can be associated with a full URL with parameter inputs (in which case the parameter input may include the unique identifier). Once the link is generated, the link generator 318 may transmit a message containing the link to the electronic address specified in the request to obtain the authenticated images. The message may include a note specified by the request, the client-generated identifier, the unique identifier (if different than the client-generated identifier, contact information, and/or other information for the user). To give a conversational feel, the link generator 318 may provide multiple messages that are related to one another, such as by providing a claim number or contact number in separate messages. Upon installation and execution of the image authentication application 101 at a user device 120, the authentication server 110 may receive one or more images from the image authentication application 101.

The server-based image authentication application 320 may authenticate the one or more images in various ways. For example, the server-based image authentication application 320 may authenticate the one or more images by performing a reverse image search on each image. In this example, each of the one or electronic images may be matched against a database of electronic images to determine whether a match exists. Such comparisons may include generating a hash of the image (and/or using the hash provided by the image authentication application 101 executing at user device 120) to be searched and comparing the hash against the hash of each image in the database of electronic images. A match between the hashes may indicate that the electronic image uploaded from the user device 120 is one that already exists, suggesting that the image is not authentic. For example, the image could be an existing image that was taken by the image authentication application 101 or copied from an online search and uploaded (assuming that the image authentication application 101 could have been tampered with to do so).

Other methods of authentication may be performed as well or in the alternative, such as comparing metadata indicating a location at which the image was generated with an expected location (e.g., comparing the location of where the image was taken with a home or other expected address/location of the user in which a deviation of a predefined distance from the expected location may result in the image being not authenticated), comparing a time at which the image authentication application 101 was downloaded and a time at which an image was taken or uploaded to the authentication server 110, comparing a time at which an image was taken with a time at which the image was uploaded to the authentication server 110, comparing a time at which the image authentication application 101 was opened and the time at which an image was taken, comparing a time at which the image authentication application 101 was opened and the time at which an image was uploaded, comparing a location at which the image authentication application 101 was downloaded and a location at which an image was taken or uploaded to the authentication server 110, comparing a location at which an image was taken with a location at which the image was uploaded to the authentication server 110, comparing a location at which the image authentication application 101 was opened and the location at which an image was taken, comparing a location at which the image authentication application 101 was opened and the location at which an image was uploaded, and/or other validation techniques. The foregoing time and/or geographic requirements help to ensure that the user has not had sufficient time to edit the image file.

These and other authentication technology described in more detail with respect to FIG. 4 below, as well as in U.S. patent application Ser. No. 14/816,712, entitled "SYSTEMS AND METHODS FOR AUTHENTICATING PHOTOGRAPHIC IMAGE DATA," filed on Aug. 3, 2015 (issued as U.S. Pat. No. 9,300,678 on Mar. 29, 2016), and U.S. patent application Ser. No. 15/728,869, entitled "METHODS FOR AUTHENTICATING PHOTOGRAPHIC IMAGE DATA," filed on Oct. 10, 2017, the contents of each of which are hereby incorporated by reference in their entireties herein.

The blockchain agent 322 may generate a transaction to be transmitted to a blockchain network. The transaction may be written as a block to the decentralized ledger. For instance, the blockchain agent 322 may generate and transmit a transaction each time an image is taken, uploaded, and/or at other times (when operated on the user device 120). The blockchain agent 322 may generate and transmit a transaction each time the image is received, authenticated, and/or at other times (when operated on the authentication server 110). The transaction's payload may include a hash of an image generated at the image authentication application. In this manner, an immutable record of the image at various stages or processes may be recorded in the decentralized ledger. For example, the hash of an image at the time of generation, upload, authentication, and/or at other times may be retrieved from the decentralized ledger and compared with one another to verify that a corresponding image has not been tampered with throughout these processes.

Figure 4:
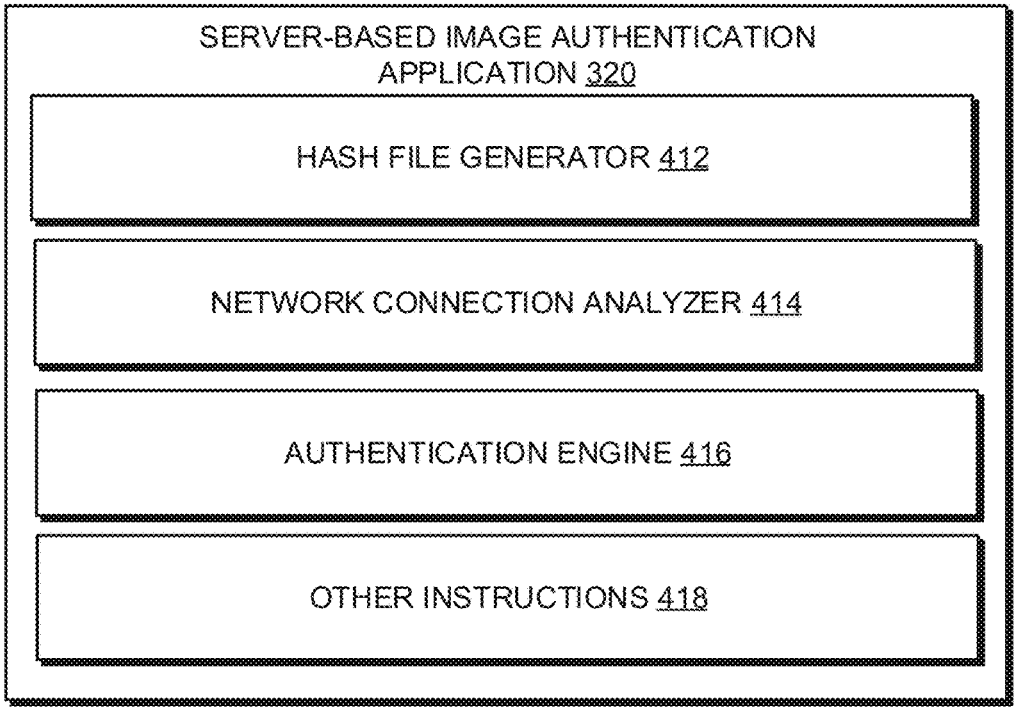
FIG. 4 illustrates an example of a server-based authentication application, according to an implementation of the invention.

FIG. 4 illustrates an example of a server-based image authentication application 320, according to an implementation of the invention. In some implementations, as programmed by the server-based image authentication application 320, the authentication server 110 may process at least some or all of the time, geographic, and/or other restrictions assessed by the user device 120. For example, the authentication server 110 may receive, from the image authentication application 101, time, geolocation, and/or other information used to determine whether the user had sufficient time to alter an image file. Authentication server 110 may accordingly perform some or all of the assessments performed by the image authentication application 101 discussed with reference to FIG. 5 below. In such implementations, authentication server 110 may proceed to further authenticate an image file as described herein only when such assessments indicate that the user has not had sufficient time to alter the image file.

In some instances, the authentication server 110 may use the geographic information (e.g., coordinates) received from the user device 120 in various ways. For example, the image authentication application 101 may request the user to indicate the location the photograph was taken (e.g., an address or name of location), and transmit that information along with application-recorded coordinate information to the authentication server as part of the photographic image file. The authentication server 110 may then compare the recorded coordinate information with the address/point of interest information provided by the user to insure that the user has provided accurate geographic information. Alternatively, the authentication server 110 may take coordinate information provided by the image authentication application 101 to search for a corresponding address or nearby points of interest, and suggest these addresses/points of interest to the user. The user may be given the option to include geographic information with the authenticated image file or remove it, but is prohibited from modifying location information or adding unverifiable location information.

The authentication server 110 may create a resource location identifier associated with an authenticated image file and/or the watermarked image so that third party viewers can visit the URL and confirm that the image has been authenticated. The resource location identified may be a web address or a shortened web address to direct a third party viewer to a webpage where they can view the authenticated image and/or the watermarked image. A copy of the authenticated image and/or the watermarked image can be uploaded to the web address so that third party viewers can view the authenticated image and/or compare an image they have received with the authenticated image at the web address. The third party viewer may receive an allegedly authenticated image file from a user of the photographic data authentication system. The image file may include a watermark that indicates that the photograph has been authenticated. However, it is possible that the user has falsely applied the watermark to an unauthenticated and/or edited image file. To confirm that the image file has, in fact, been authenticated and has not been edited in any way, the third party viewer may visit the web address associated with the watermarked image. The web address may appear on the watermarked image itself (for example, may be part of the watermark), or may be provided by the sender of the image, or may be embedded in the image such that clicking on the watermarked image will lead the user directly to the web address. In certain embodiments, the web address may be the full address, or a representation of the address (e.g., a QR code, or a tinyURL, or a bitly address). By visiting the web address, the third party viewer can verify that the allegedly authenticated photograph has, in fact, been authenticated based on the functions described herein.

In some implementations, an authenticated image file may include authenticated metadata provided by the authentication server 110, such as a server-applied time stamp, date stamp, and geographic information. The authenticated image file may also include a resource location identifier associated with the authenticated image file. In certain embodiments, this resource location identifier may be a web address or a representation of a web address (e.g., bitly code, tinyURL, or QR code). In this scenario, the authenticated image file, or certain portions of the authenticated image file may be uploaded to a website viewable by third parties. The user can share the authenticated image file with third party viewers to represent that the image being shared has not been edited or revised. Third party viewers can view the authenticated image file and access the web address to confirm that the image has been verified by the authentication server and has not been revised.

The authenticated image file may comprise any combination of an authenticated image (i.e., the original image once it has been verified by the authentication server), authenticated image metadata (e.g., authentication server-provided or authentication server-approved timestamp, datestamp, and geographic data), and/or a watermarked image, the watermarked image being the authenticated image with a visual watermark affixed to it to represent that it has been verified by the authentication server. Attention will now be turned to the various components the foregoing and other implementations.

Having described various implementations of whether or not a user has had time to alter an image file and results of authentication, attention will now be turned to various authentication server components 120 that facilitate these and other functions. Authentication server 110 may include one or more physical processors 312, one or more electronic storage devices 314, and/or other components.

In an implementation, the one or more physical processors 312 may be programmed by computer program instructions, such as those stored in the one or more electronic storage devices 504. For example, the one or more physical processors 312 may be programmed by, among other instructions, a server-based image authentication application 320.

In an implementation, the server-based image authentication application 320 may include various instructions such as, without limitation, a hash file generator 412, a network connection analyzer 414, an authentication engine 416, and/or other instructions 418. As used herein, for convenience, the various instructions will be described as performing an operation, when, in fact, the various instructions program the physical processors 312 (and therefore authentication server 110) to perform the operation.

Figure 5:
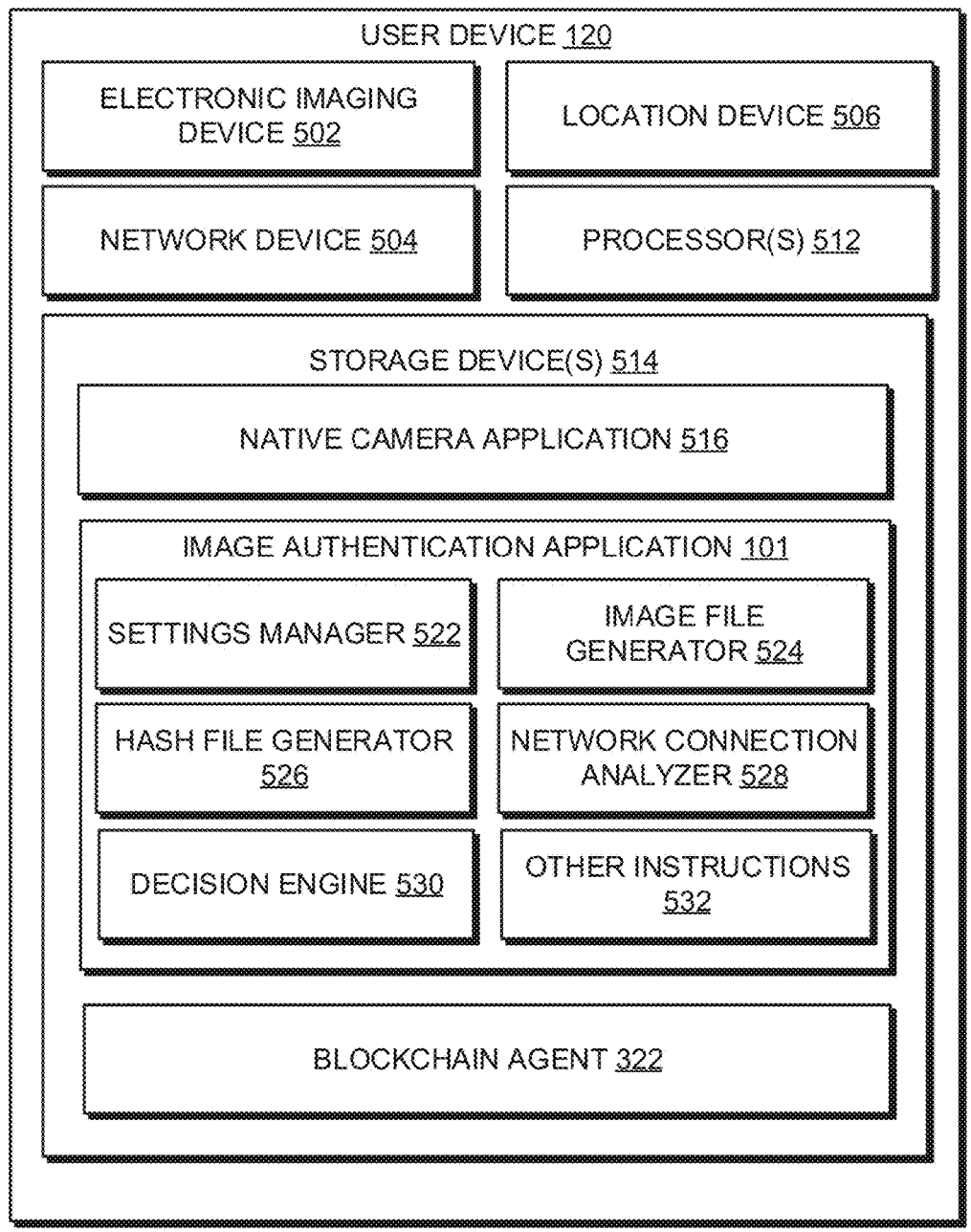
FIG. 5 illustrates a user device that captures an image for authentication using a custom image authentication application instead of a native camera application, according to an implementation of the invention.

In an implementation, hash file generator 412 is the same as hash file generator 526 used by the image authentication application 101 illustrated in FIG. 5. This is so that a hash file of a given image file can be deterministically generated at both the authentication server 110 and the user device 120. Examples of hash functions used by hash file generator 412 may include, without limitation, SHA-256 and SHA-512. In some implementations, various versions of hash file generators may be stored in a database. To the extent that different versions of hash file generators are used at different user devices 120 (e.g., different versions of image authentication applications use different hash file generators), a database may be used to retrieve an appropriate version or type of hash file generator. In these implementations, user device 120 may communicate information identifying the version or type of hash file generator used. Such information may be in the form of an image authentication application version, an identifier for the hash file generator, and/or other identifying information used by authentication server 110 to retrieve the appropriate hash file generator to use.

In an implementation, a network connection analyzer 414 may participate in network connection analysis and/or perform the functions of the network connection analyzer 528 used by the image authentication application 101 illustrated in FIG. 5. In this manner, the authentication server 110 and/or the user device 120 may assess the quality of a network connection via which the authentication server 110 and user device 120 communicate.

In an implementation, the authentication engine 416 facilitates authentication of image files captured at user devices 120 even if use of a network connection to send image files from the user devices 120 to the authentication server 110 should be limited (e.g., to minimize cellular data plans and/or when the network connection is poor). For example, the authentication engine 416 may receive a hash file of an image file for an image captured at user device 120. Because the hash file is smaller in size than the image file, sending the hash file over a cellular connection or "poor" quality (as described herein) connection may be more efficient.

FIG. 5 illustrates a user device 120 that captures an image for authentication using a custom image authentication application 101 instead of a native camera application 516, according to an implementation of the invention. The user device 120 may provide various conventional messaging interfaces (not illustrated) such as a SMS or MMS text message application, an e-mail client, a chat interface, and/or other application or service that can deliver electronic communications, such as the message having a link from the authentication server 110. Through one or more of the messaging interfaces, the user device 120 may display the message with the link. Upon selection of the link, the user device 120 may download and install the image authentication application 101. For instance, the user device 120 may store the image authentication application 101 in one or more storage devices 514. The image authentication application 101 may program the user device 120 to operate as described in this disclosure. The user device 120 may also be programmed with its version of blockchain agent 322 (which may be installed as part of or standalone from the image authentication application 101), which operates in the same manner as described with respect to authentication server 110, except that images, image metadata, and/or other information from the user device 120 may be written to the decentralized ledger 2.

In an implementation, user device 120 may include any device capable of capturing images including, but not limited to, cell phones, smart phones, tablet computers, laptop computers, digital cameras, web cameras, laptop computers, desktop computers, security cameras, televisions, monitors, and the like. Referring to FIG. 5, which illustrates a device for authenticating image files, captured at the device, in conjunction with an authentication server, user device 120 may include an electronic imaging device 502, one or more network devices 504, location device 506, one or more processors 512, one or more electronic storage devices 514, and/or other components.

Upon installation, the image authentication application 101 may request that the user take one or more electronic images. For example, the image authentication application 101 may automatically open and provide an interface that the user may use to take pictures (or videos or other type of image). The interface may include, for example, an input member to initiate taking a picture. In some instances, the image authentication application 101 may transmit the taken images without an express approval from the user to do so. In other implementations, the image authentication application 101 may provide the user with the ability to cancel sending a picture (so that a better picture may be taken, for example). In some implementations, the image authentication application 101 may generate a hash of a taken image and transmit, to the authentication server 110, the hash instead of or in addition to the image. In some of these implementations, a decision of whether or not to send the image or the hash may depend on a quality or other characteristics of the network connection currently available to the user device 120, as described in U.S. patent application Ser. Nos. 14/816,712 and 15/728,869, the contents of which have already been incorporated by reference.

In some implementations, a user may be permitted to open the image authentication application 101 at a later time. In these implementations, when a user wishes to take an image to be authenticated, the user opens the image authentication application 101 on the user device 120 to capture an image. When it is opened, the image authentication application 101 may record the time that the image authentication application is opened, the geographic location of the client device at the time the image authentication application is opened, and/or other information relevant to capturing images using the image authentication application. The foregoing and other information may be used later as metadata for authentication. Once the user captures an image using the image authentication application 101, the image authentication application may generate an image file based on the captured image and may assess an available network connection to determine whether the image file may be transmitted via the available network connection. The image authentication application 101 may obtain time, location, and/or other metadata at the time of image capture. Alternatively, prior to allowing the user to capture the image, the image authentication application 101 may assess an available network connection (or determine that no network connection is available). In this instance, the image authentication application 101 may not permit the user to capture an image if no network connection is available (or if an available network connection is available but should not be used for various reasons described herein).

In some instances, the image authentication application 101 may receive a request from the user to send the image file for authentication in response to which it may determine one or more characteristics of an available network connection and determine that the image file should not be sent via the network connection. In these instances, the image authentication application 101 may take one or more steps to confirm that the user has not had the opportunity to edit the image file by ensuring that certain time and/or geographic restrictions are satisfied. For example, the image authentication application 101 may note the time at which the image authentication application was opened, and the time at which the request to transmit the image file is made. If the request to transmit the image file is made sufficiently soon after the image authentication application is opened (for example, within one minute or other threshold time), then the image authentication application may authorize further operations to send the image file to proceed. Otherwise, the request to transmit the image file may be denied and the image file may be deleted or marked as unauthenticated. The image authentication application 101 may use other data for such verification as well or instead of time information. For example, the image authentication application 101 may compare the geographic location of the user device 120 at the time the image authentication application was opened and the geographic location of the device at the time the user requests transmission of the image file to the authentication server 110 to ensure that the user has not moved a great distance (e.g., less than 200 feet or other threshold distance value). Otherwise, the request to transmit the image file may be denied and the image file may be deleted or marked as unauthenticated. The foregoing time and geographic requirements help to ensure that the user has not had sufficient time to edit the image file.

Additional restrictions may be placed by the image authentication application 101 to assist in this authentication process. For example, the image authentication application 101 may only allow images taken within the image authentication application 101 to be transmitted to the authentication server 110. The image authentication application 101 may also prohibit the use of any editing tools within the image authentication application 101, or to prohibit exporting of image files so that the user cannot export image files to another program for editing. In this way, the image authentication application 101 ensures that the image file has remained within the approved application environment for the entirety of the image file's existence, and that the user has not been given the opportunity to revise any portion of the image file, including the image itself or the associated metadata.

In implementations that use the foregoing and other restrictions, once the image authentication application 101 has confirmed that the image file satisfies such restrictions, it may generate a hash file based on the image file and send the hash file to the authentication server 110. When the available network connection improves and/or another network connection becomes available, the image authentication application 101 may send the image file. Metadata (e.g., time and location data) associated with the image file may be sent along with the hash file and/or the image file. The authentication server 110 performs various tasks to authenticate the image file, including storing the hash file in association with the identifying information.

When a copy of the image file is received from the user device 120, the authentication server 110 may generate a server-generated hash file based on the copy, and compare the server-generated hash file with the user device-generated hash file. A match between the server-generated hash file and the user device-generated hash file may indicate that the copy of the image file has not been tampered with or altered since the original copy was created (because the user device-generated hash file was generated by the image authentication application 101 on the original). Upon authentication the authentication server 110 may apply a watermark and/or provide another indication that the image file has been authenticated.

Electronic imaging device 502 may include an electronic image sensor configured to detect and convey information used to generate an image. For example, electronic imaging device 502 may include, without limitation, a charge coupled device ("CCD") sensor, a complementary metal-oxide-semiconductor ("CMOS") sensor, and/or other type of device configured to detect and convey information used to generate an image. The image may include a still image (e.g., a photograph), a video image, and/or other types of images.

Network device 504 may include a network interface device configured to connect to and transmit data over a network, such as network 102 (illustrated in FIG. 1). In some implementations, user device 120 may include a network device 504 for each of different types of network connections that may be available. For example, and without limitation, one network device 504 may be configured to connect to a cellular data connection (e.g., "3G/4G/5G/etc.") provided through a wireless service provider, while another network device 504 may be configured to connect to a Wireless Fidelity "WiFi") connection using a IEEE 802.XX or other specification. Other types of network connections through which communication with authentication server 150 across a network may be used as well. In some implementations, a single network device 504 may be configured to connect to multiple types of network connections as well.

Location device 506 may include a device configured to detect information used identify a physical (e.g., geographic) location of the location device. For example, and without limitation, location device 506 may include a Global Positioning System ("GPS") sensor device, a WiFi device (for obtaining hotspot location information), a network device (for obtaining IP address-based physical locations), and/or other type of location device configured to produce information used to identify a physical location of the location device 506 (and therefore the user device 120).

In an implementation, the one or more processors 512 may be programmed by computer program instructions, such as those stored in the one or more electronic storage devices 514. For example, the one or more processors 512 may be programmed by, among other instructions, a native camera application 516 and an image authentication application 101. The native camera application 516 may be an executable application, which is a different executable application than the image authentication application 101, that captures images using electronic imaging device 502. Native camera application 516 typically stores image files it generates in an accessible file location, such as a camera directory that is readable using an image album application. From the accessible file location, such image files are readily accessed and able to be edited. To help prevent such open access and editing functions, image authentication application 101 may be configured with its own image capture and storage functionality, as described herein.

In an implementation, image authentication application 101 may include various instructions such as, without limitation, a settings manager 522, an image file generator 524, a hash file generator 526, a network connection analyzer 528, a decision engine 350, and/or other instructions. As used herein, for convenience, the various instructions will be described as performing an operation, when, in fact, the various instructions program the processors 512 (and therefore user device 120) to perform the operation.

User-Defined Settings and System Rules that Control Operation of the Image Authentication Application The settings manager 522 may obtain, from a user, one or more user-defined settings to be applied to operation of the image authentication application 350. For example, the settings manager 522 may expose a user interface with input settings that allow a user to configure the behavior of the image authentication application 350. The user-defined settings may include, without limitation, a setting that indicates types of network connections in which image files should not be transferred, a setting that indicates types of network connections in which image files may be transferred, a setting that indicates a maximum file size permissible for an image file to be transferred, and/or other user-definable settings that control the behavior of the image authentication application 350.

The various settings may be combined or otherwise used in connection with one another. For example, a user may specify that image files should not be sent over a cellular data connection, but can be sent over a WiFi connection. The user may specify that image files over a certain size should not be sent over a cellular data connection. Other types of network connections may be specified as well or in the alternative. In some instances, a user setting may specify that image files should not be transmitted when an available network connection is of low quality (i.e., only when an available network connection is "strong"). Such "low quality" or "strong" quality may be measured based on, for example, network latency, network error rates, and/or other network metrics that may be measured to determine whether or not they meet certain quality thresholds (which may be specified by the user and/or predefined by the image authentication application 350). In some instances, the image authentication application 350 may decide (whether or not based on a user-defined setting) whether to send an image file based on the quality of an available network connection. For example, a predefined network metric threshold may be used to determine what is a "low quality" network connection and what is a "strong" network connection. It should be noted that a single quality metric need not be used. For instance, a combination of quality metrics may be used, weighted, and scored to generate an overall network quality score, which may be compared to an overall network quality threshold. The foregoing threshold values may be predefined by a user-defined setting and/or a system rule, discussed below.

In addition to or instead of the user-defined settings, the settings manager 522 may obtain predefined system rules that control operation of the image authentication application 350. The predefined system rules may include settings that are the same as the user-defined settings, but instead of being set by the user, the predefined system rules may be set by a developer or others who are not an end user of user device 120. In this sense, in some implementations, one or more of the system rules may provide default settings for corresponding ones of the user-defined settings. In other implementations, the system rules may prohibit any user-defined settings and require only the system rules to be used.

Capturing an Image and Generating an Image File

Using the electronic imaging device 502, image file generator 524 may capture an image and generate an image file. Depending on the type of image that is captured (e.g., photograph, video, etc.), image file generator 524 may encode the captured image into an image file according to an appropriate encoding technique (e.g., JPEG/PNG/etc. for photographs, MPEG/NTSC/etc. for videos, and so on). In some implementations, image file generator 524 may store the image file in a file location on the electronic storage device 114 such as a hidden file location. Such hidden file location may not be exposed to the user of user device 120, but is accessible to the image authentication application 350. For example, the hidden file location may be obfuscated from the user using native operating system hidden file directory techniques. Other file locations may be used as well.

Generating Hash Files

In some implementations, the hash file generator 526 may generate a hash file based on an image file. For example, the hash file generator 526 may generate a hash of the image file using a hash function and generate the hash file based on the hash. In some implementations, the hash function may map data from the image file into data of a fixed size, in which the fixed size (e.g., memory footprint) is smaller than size of the image file. In some instances, the fixed size is orders of magnitudes smaller than the size of the image file (depending on the size of the image file itself). The hash function may generate a deterministic hash according to the content of the image file. For example, using the hash function, a hash of the image file will be the same as the hash of a copy of the image file if the copy is not altered. On the other hand, using the hash function, a hash of the image file will be different than a hash of a copy of the image file that has been altered (and also different than a hash of another file altogether). The hash function may be similar to the one used by the authentication server. Examples of hash functions that may be used include, without limitation, SHA-256 and SHA-512.

Assessing Network Characteristics

In an implementation, the network connection analyzer 528 may determine one or more characteristics of an available network connection. An available network connection is a network connection detected by, or can be established by, one or more of the network devices 504 has detected (e.g., a network connection in which the network devices 504 has detected broadcast network information from an access point associated with the network connection, a network connection in which communication with an access point associated with the network connection has been established, a network connection in which an initial handshake communication has been initiated with an access point associated with the network connection, etc.). The one or more characteristics may include, without limitation, a type of an available network connection, a quality of an available network connection, and/or other types of characteristics that describe an available network connection.

Types of Network Connections

In some implementations, the network connection analyzer 528 may determine types of available network connections. For instance, the network connection analyzer 528 may identify a type of network connection currently used to transmit data to or from the user device 120 via network 102. In some implementations, the network connection analyzer 528 may determine that a network device 504 for a cellular network has indicated that a cellular network connection is available (and/or is currently being used to transmit and/or receive data from the user device 120). Other types of network connections (e.g., WiFi connections) may similarly be made. In some instances, the types of available network connections may be obtained from the operating system of user device 120 and/or from an operating system of a network device 504 if so configured.

As will be described, the type of available network connection may be used by the decision engine 350 to determine whether or not to send a hash file of an image file and/or determine whether or not to send the image file.

Quality of Network Connections

In some implementations, the network connection analyzer 528 may determine the quality of one or more available network connections. The quality may be assessed based on one or more metrics that indicate a quality of an available network connection. The one or more metrics may include, without limitation, a signal strength indicator, a number of dropped packets, a ratio of received packets to dropped packets (or vice versa), a network latency, a network throughput, and/or other network quality metrics that can be used to assess a quality of an available network connection.

In some instances, the network connection analyzer 528 may determine a signal strength of an available network connection. The signal strength may be obtained from, for example, a measurement of a signal transmitted from an access point such as a cellular base station, a signal transmitted from WiFi router or other WiFi access point, a measurement from an access point of a signal transmitted from the user device 120 to the access point, and/or other signal measurement.

In some instances, the network connection analyzer 528 may determine a number of dropped packets from information exchanged between an access point (e.g., a cellular network base station, a WiFi router, etc.) and user device 120.

In some instances, the network connection analyzer 528 may obtain a number of dropped packets versus received packets and/or a ratio of the foregoing. For instance, the network connection analyzer 528 may obtain a burst error rate and/or other network transmission metric that determines a number or ratio of received packets and dropped packets.

In some instances, the network connection analyzer 528 may obtain a current throughput of the network connection available at the first time. In some instances, the throughput may be obtained based on network performance information exchanged between the user device 120 and an access point (e.g., using control channels). In some instances, the network connection analyzer 528 may obtain an upload throughput by transmitting one or more predefined sets of data with known size to a networked device (such as authentication server 150). In this implementation, the network connection analyzer 528 may transmit a predefined set of data to the networked device and determine a length of time it took for the set of data to reach the networked device (based on an acknowledgement receipt from the networked device). The network connection analyzer 528 may determine the throughput based on the size of the set of data and the length of time. Alternatively or additionally, the network connection analyzer 528 may receive the length of time and/or the throughput calculation from the networked device.

In some instances, the network connection analyzer 528 may obtain a download throughput using similar techniques as for an upload throughput, but instead of measuring transmission of a set of data from the user device 120 to the networked device, the user device 120 and/or networked device measures a set of data transmitted from the networked device to the user device 120. It should be noted that the upload throughput and/or the download throughput may be used as a network characteristic for the decision process described herein.

In some instances, the network connection analyzer 528 may obtain a current latency of the network connection available at the first time. In some instances, the latency may be obtained based on network performance information exchanged between the user device 120 and an access point (e.g., using control channels). In some instances, the network connection analyzer 528 may obtain the latency by transmitting or receiving one or more predefined sets of data with known size to a networked device (such as authentication server 150). In this implementation, the network connection analyzer 528 may transmit a predefined set of data to the networked device and determine a length of time it took for the set of data to reach the networked device (based on an acknowledgement receipt from the networked device). The network connection analyzer 528 may determine the latency based on the length of time. Alternatively or additionally, the network connection analyzer 528 may receive the length of time and/or the latency calculation from the networked device. In some instances, the length of time is used as a latency value.

It should be noted that more than one network connection may be "available" as described herein. In these instances, the network connection analyzer 528 may assess the characteristic of an available network connection currently being used to transmit data to or from the user device 120 over a network, such as network 102.

Decision Engine

In some implementations, a decision engine 350 may determine whether to transmit an image file and/or a hash file of the image file based on the one or more characteristics of an available network connection. For example, the decision engine 350 may obtain the one or more characteristics from the network connection analyzer 528 at a first time and determine that a hash file should be sent instead of the image file based on the one or more characteristics of a current network connection available at the first time. Upon transmission of the hash file, the decision engine 350 may periodically obtain characteristics of an available network connection at later times. For example, the decision engine 350 may obtain characteristics of an available network connection at a second time and determine that the image file may be sent.

Various examples of scenarios may cause the decision engine 350 to determine that the image file should be sent at the second time (but not at the first time). In one example, network conditions (e.g., quality) on the same type of network connection may have improved from the first time to the second time. In this example, the signal strength, dropped versus successful packet ratio, latency, throughput, and/or other quality metrics may have improved beyond a threshold quality level at the second time whereas such quality metrics were below the threshold quality level at the first time. In another example, a second type of network connection may have become available at the second time but was not available at the first time. The second type of network connection may be used to send image files while the first type of network connection may not. In this example, image files may be authorized to be sent while on a WiFi network but not while on a cellular network. A cellular network connection (but not a WiFi connection) may have been available at the first time, and a WiFi connection may have become available at the second time. In some instances, the decision logic of the foregoing examples may be dictated by the user-defined settings and/or the system rules.

In some instances, the system rules and/or user-defined settings may specify one or more threshold quality values. The threshold quality values may each correspond to a given type of network quality assessment. For instance, the following may be used as a predefined threshold quality value: a minimal signal strength indicator value may be used as a predefined threshold quality value (below which the decision engine 350 considers a "poor quality" connection and above which the decision engine 350 considers a "strong" connection), a predefined number dropped packets value (above which the decision engine 350 considers a "poor quality" connection and below which the decision engine 350 considers a "strong" connection), a ratio of received packets to dropped packets (below which the decision engine 350 considers a "poor quality" connection and above which the decision engine 350 considers a "strong" connection), a network latency value (below which the decision engine 350 considers a "poor quality" connection and above which the decision engine 350 considers a "strong" connection), a network throughput value (below which the decision engine 350 considers a "poor quality" connection and above which the decision engine 350 considers a "strong" connection), and/or other threshold values that can be used to assess a poor quality or strong network connection. In implementations that use a combination of one or more of the foregoing, the threshold value may be predefined to reflect a combination quality score. In each of the foregoing examples of threshold values, the decision engine 350 may determine whether or not a weak or strong connection exists based on whether the current network quality metric deviates from the threshold value (e.g., is above or below, depending on the threshold value used).

Based on the comparison of a current quality metric and a corresponding threshold value, the decision engine 350 may determine whether or not the image file or a hash file should be sent. For example, for "poor quality" network connections, the hash file and not the image file may be sent. For "strong" network connections, the image file may be sent.

Figure 6:
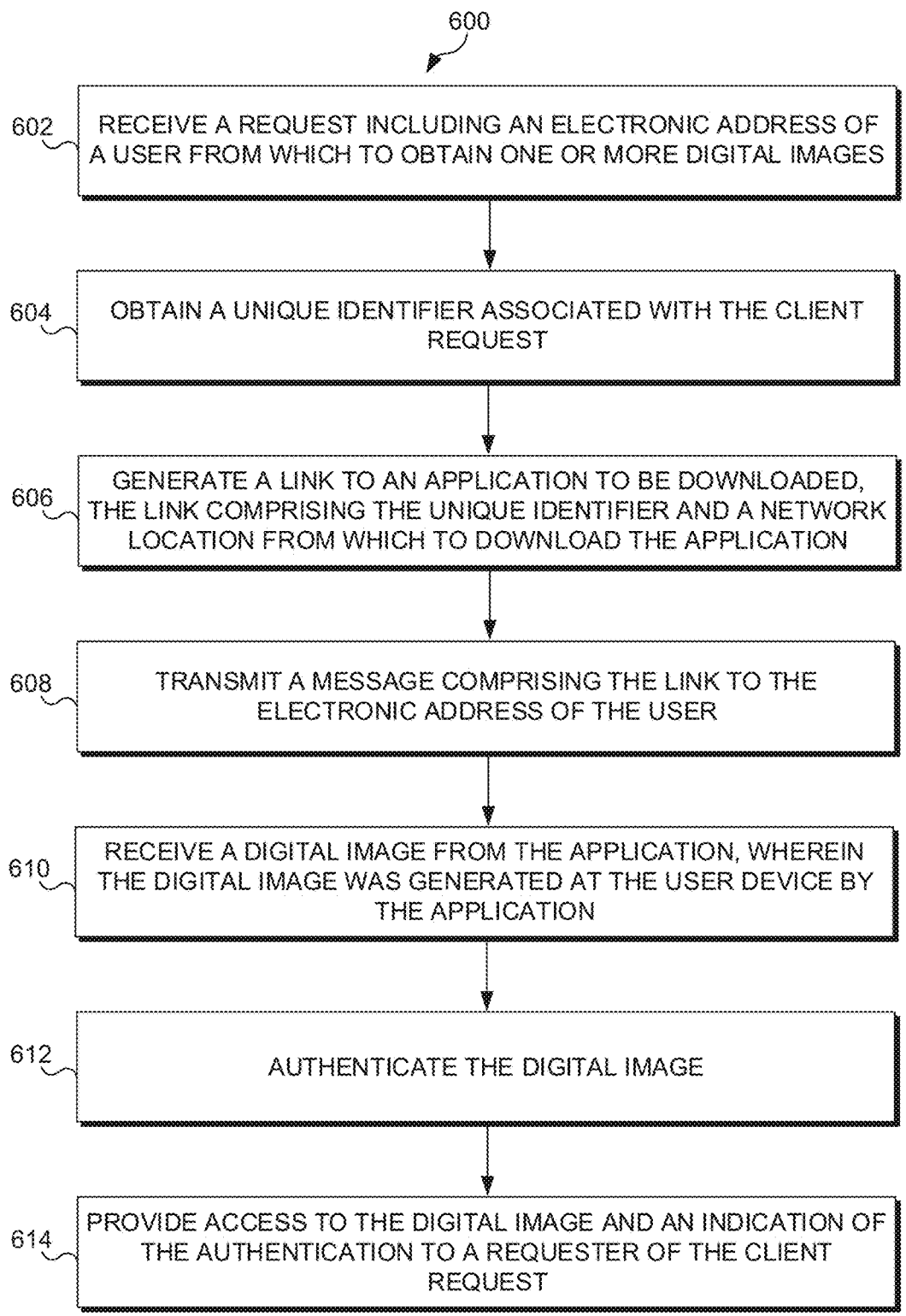
FIG. 6 illustrates a process authenticating image files from user devices, according to an implementation of the invention.

FIG. 6 illustrates a process 600 for authenticating image files from user devices, according to an implementation of the invention.

In an operation 602, process 600 may include receiving a request to obtain one or more electronic images to be authenticated. The request may include an electronic address of a user from which to obtain the one or more electronic images. In an operation 604, process 600 may include obtaining a unique identifier associated with the request. The unique identifier may be provided in the request or be generated by the system. In an operation 606, process 600 may include generating a link to an application to be downloaded, the link comprising the unique identifier and a network location from which to download the application. In an operation 608, process 600 may include transmitting a message comprising the link to the electronic address of the user, wherein the link when selected causes a user device used to select the link to download the application. In an operation 610, process 600 may include receiving an electronic image from the application, wherein the electronic image was generated at the user device by the application. In an operation 612, process 600 may include authenticating the electronic image. In an operation 614, process 600 may include providing access to the electronic image and an indication of the authentication to a requester of the request.

Figure 7:
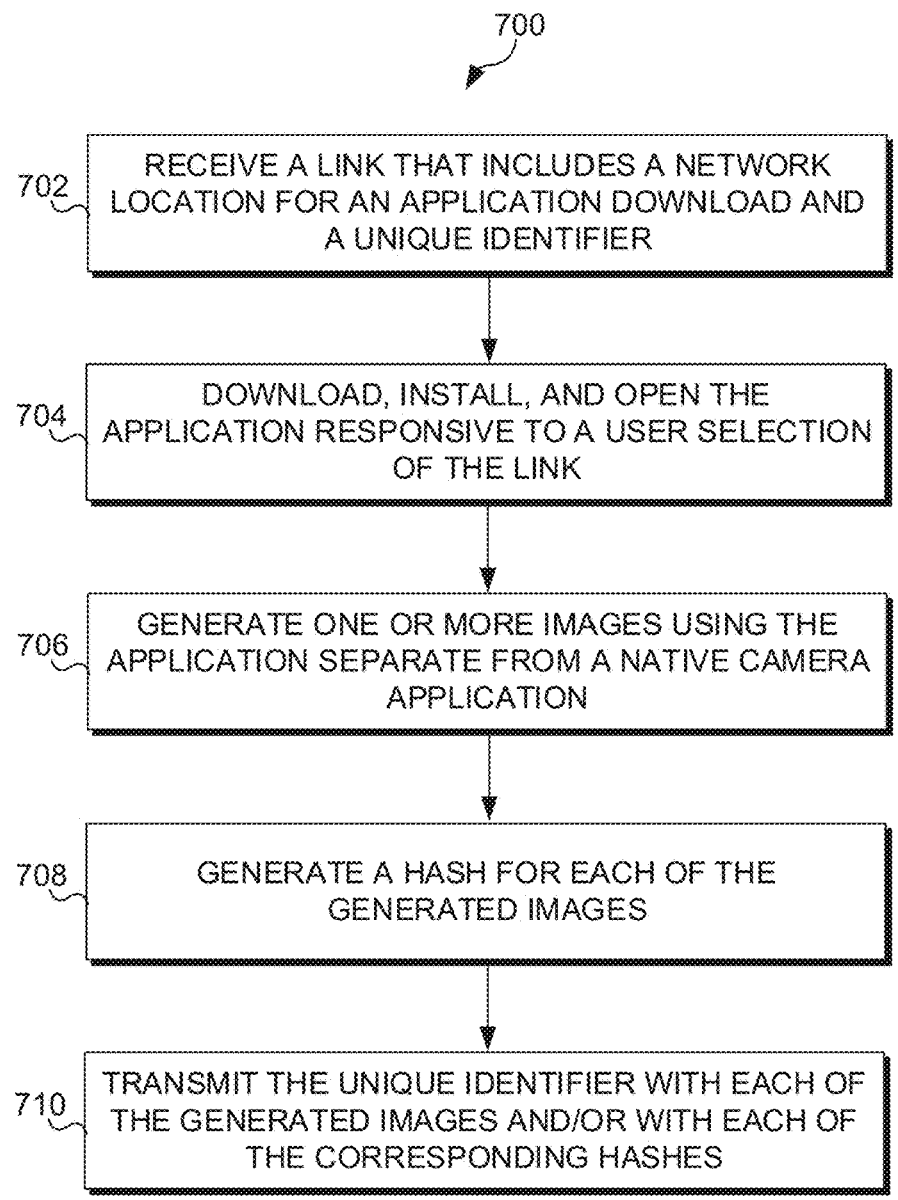
FIG. 7 illustrates a process for locating, installing, and opening an image authentication application for generating and uploading images for authentication, according to an implementation of the invention.

FIG. 7 illustrates a process 700 for locating, installing and opening an image authentication application 101 for generating, and uploading images for authentication, according to an implementation of the invention. In an operation 702, process 700 may include In an operation 704, process 700 may include receiving a link for downloading an image authentication application 101. The link may specify a download location and encode a unique identifier. In an operation 706, process 700 may include downloading, installing, and opening the image authentication application 101 responsive to a user selection of the link. In an operation 708, process 700 may include generating one or more images using the image authentication application 101, which is separate from a native camera application 516 that may be included with the user device at which the image authentication application 101 executes. In an operation 710, process 700 may include transmitting the unique identifier with the generated images, hash for each of the generated images, metadata, and/or other information to the authentication server 110. It should readily be appreciated that authenticated images can be beneficial and useful in many different applications. By way of example, authenticated images can be used by inspection companies that wish to document property inspections, financial companies or others that with to implement "know your customers" by requiring authenticated images of documents such as a utility bill, dating websites, social networks, casting directors, and the like to ensure accurate and recent images of users. Parents may request and obtain authenticated images to verify the whereabouts and activities of their children or employers the whereabouts of their employees. Social media users can request and obtain images relating to experiences and users can view friends' images with full faith that the image is an accurate representation of their activities. Delivery services can provide reliable package tracking and location information. Customers making online purchases or reservations can request and verify the condition of the item they are purchasing or the item/property/vehicle they are renting. News outlets can request and verify source image information. Witnesses to a crime or accident can provide on request, reliable, verifiable images taken at the scene. These are but a few of the myriad of uses that are possible with authenticated images.

Figure 8:
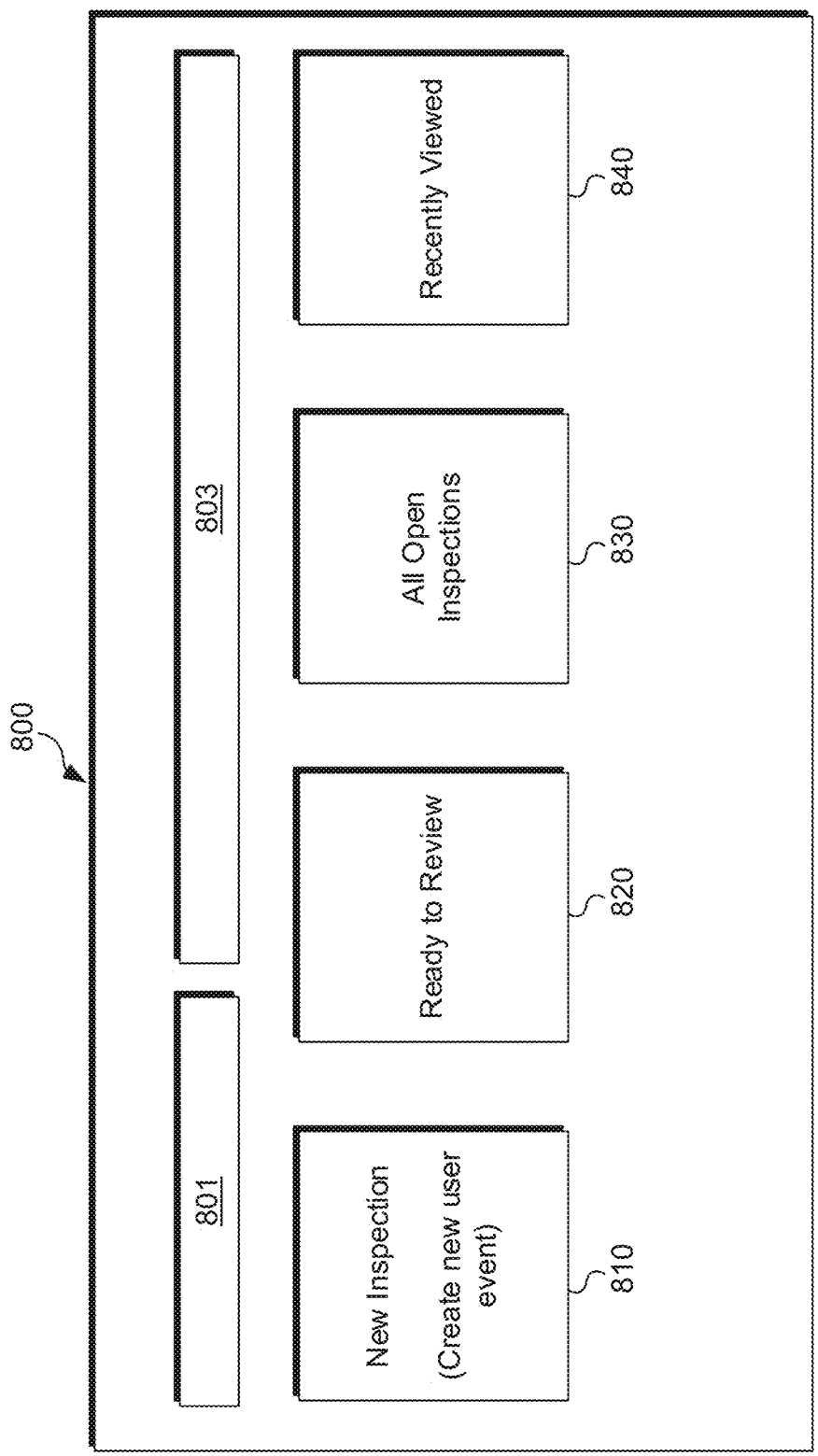
FIG. 8 illustrates a screen shot depiction of a landing page interface of an interface portal provided by the system, according to an implementation of the invention.

FIG. 8 illustrates a screen shot depiction of a landing page interface 800 of the interface portal 216 provided by the system, according to an implementation of the invention. In each of the various interfaces (e.g., 800-1100) described herein, like reference signs refer to the same interface component. Furthermore, the interfaces 800-1100 described herein are for illustrative purposes. Various interface components may be rearranged, added, or deleted as necessary. The landing page interface 800 may be displayed by the interface portal 216 upon logon of an administrator of an entity that wishes to obtain authenticated images from its users. For example, the landing page interface 800 may be presented to an insurance adjuster of an insurance company that wishes to obtain photos of damage to an insured property.

The landing page interface 800 may include a white-label 801 that provides graphics and/or text to provide a look-and-feel of the entity, a search input 803, a new inspection link 810, a ready to review link 820, an inspection workflow link 830, a recently viewed link 840, and/or other interface components. The search input 803 may include display options for receiving search terms to search the computer system 104. The search terms may include a search for users such as insured users and/or other terms.

Figure 9:
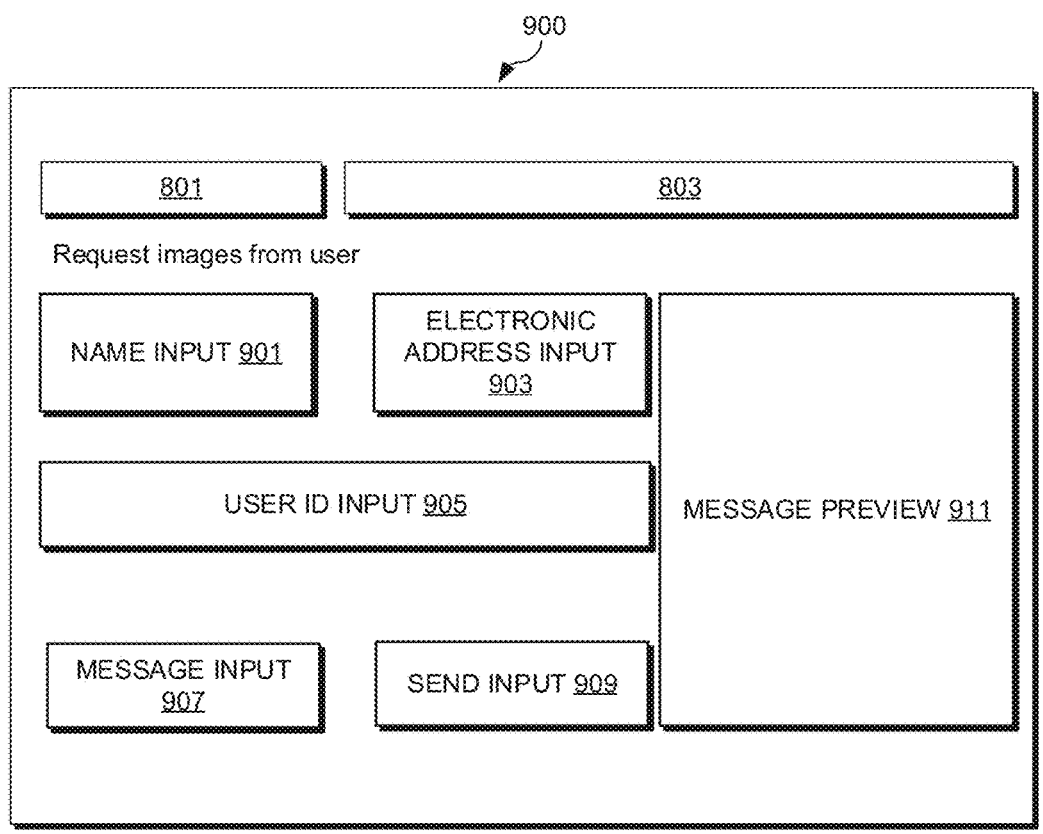
FIG. 9 illustrates a screen shot depiction of an image request interface of an interface portal provided by the system, according to an implementation of the invention.
Figure 10:
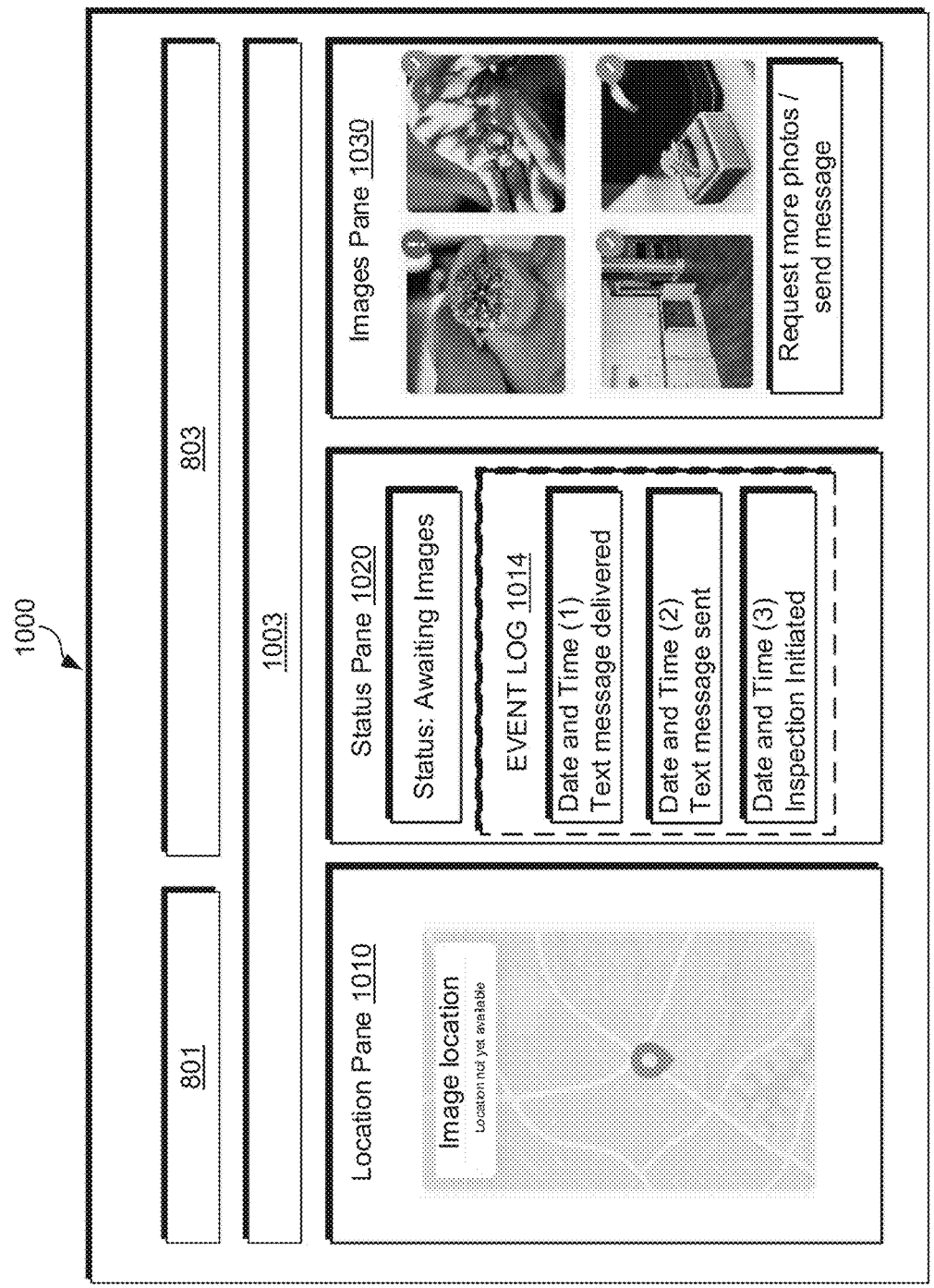
FIG. 10 illustrates a screen shot depiction of an inspection view interface of the interface portal provided by the system, according to an implementation of the invention.
Figure 11:
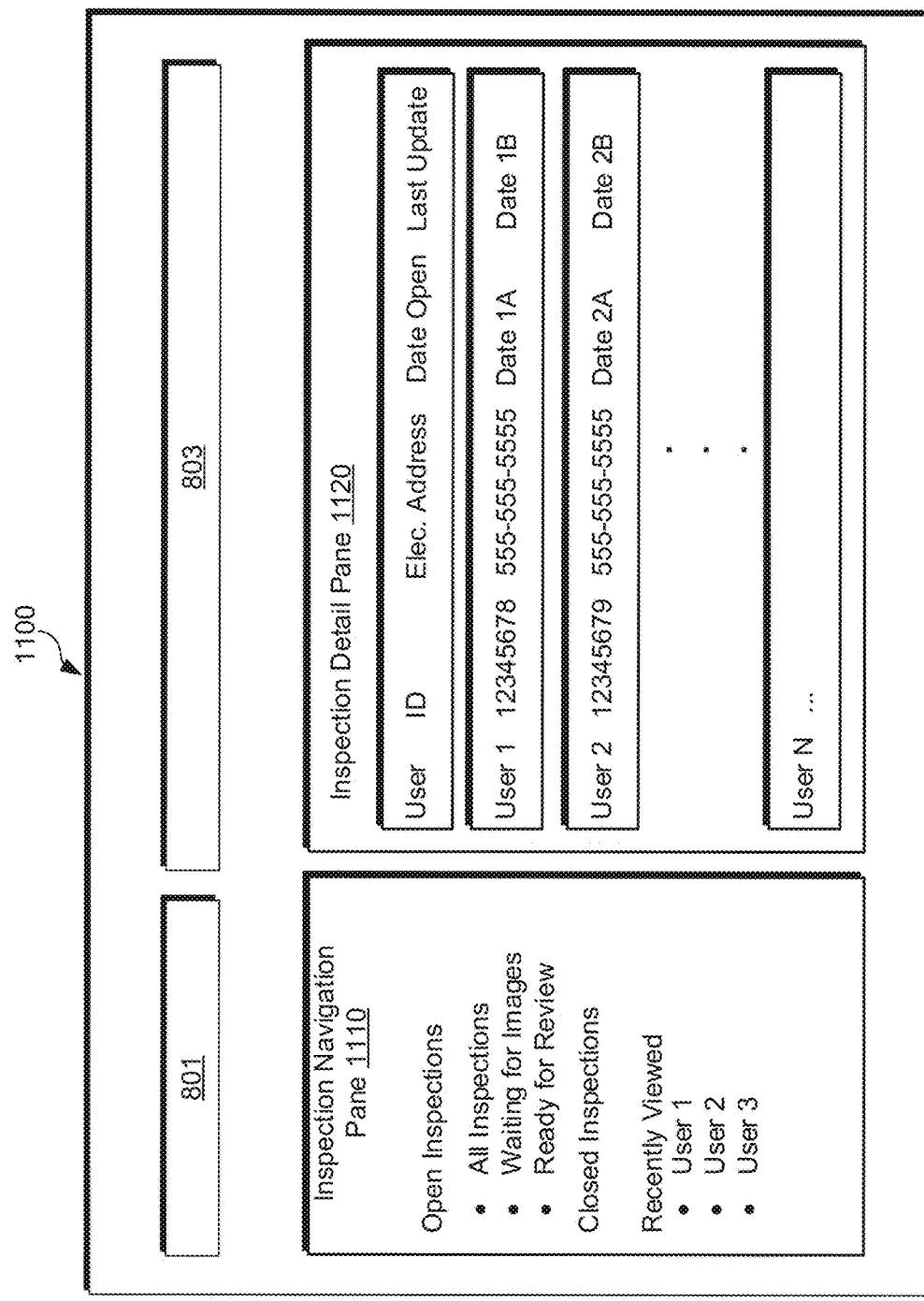
FIG. 11 illustrates a screen shot depiction of an inspection listing interface of the interface portal provided by the system, according to an implementation of the invention.

The landing page interface 800 may include various links to other pages. For example, the New Inspection link 810, when selected, may cause an image request interface to be displayed. An example of the image request interface is depicted in FIG. 9. The Ready to Review link 820, when selected, may cause a listing of inspections for which images have been uploaded from users to be displayed. Upon selection of a listed inspection, an inspection view interface may be displayed. An example of the inspection view interface is depicted in FIG. 10. The All Open Inspections link 830, when selected, may cause an inspection listing interface to be displayed. An example of the inspection listing interface is depicted in FIG. 11. The Recently Viewed link 840, when selected, may cause a set of recently viewed image requests to be displayed.

FIG. 9 illustrates a screen shot depiction of an image request interface 900 of the interface portal 216 provided by the system, according to an implementation of the invention. The image request interface 900 may include input options that receive parameters for requesting authentication images from a user. For instance, the image request interface 900 may include a name input 901 for receiving an a name of a user from whom to request images, an electronic address input 903 for receiving an electronic address of the user to which to transmit a link to an image authentication application 101, a user ID input 905 to input an identifier (such as a claim number or other identifier), a note input 107 for receiving a note to be delivered to the user, a send input 909 that, when selected, sends the request to the user, and/or other input options. The image request interface 900 may provide a message preview 911, which provides a preview of how the message to be sent to the recipient will appear.

FIG. 10 illustrates a screen shot depiction of an inspection view interface 1000 of the interface portal 216 provided by the system, according to an implementation of the invention.

Inspection view interface 1000 may include an inspection information portion 1003, which displays a user that was requested to provide images, a unique identifier for an inspection, and/or other information relating to the inspection. The inspection view interface 1000 may include a location pane 1010, a status pane 1020, an images pane 1030, and/or other display options.

The location pane 1010 may include a graphical and/or textual indicator of a location from which images were taken by or transmitted from the user via the image authentication application 101. In examples (as illustrated) where an image has not yet been uploaded, a message indicating the location is unavailable is displayed. Otherwise, the location of the image may be displayed in the location pane 1010. If multiple images are uploaded, then the location may change as each image is viewed at the images page 1030.

The status pane 1020 may include a status of the inspection (such as awaiting images, images authenticated, images failed authentication including reasons for failure, etc.). The status pane 1020 may include an event log 1014 that displays a listing of events that have occurred in relation to the inspection. The event log may begin with an event relating to the original request to the user to provide the images and may track subsequent activity since the request.

The images pane 1030 may display the images that have been uploaded from the user via the image authentication application 101. In some instances, the images may be provided as thumbnails or other representations that, when selected, causes a full image to be displayed. In some instances, the images pane 1030 may display a corresponding hash file for each image and/or metadata such as location geotags. As illustrated, each image presented in the images pane 1030 may be provided with a status indicator (illustrated as a check mark or an exclamation point). The status indicator may indicate whether or not a problem has been detected with the corresponding image. For example, a check mark (or other indicator) may indicate that the image is ready for review. An exclamation point (or other indicator) may indicate a problem with the image and that a replacement image should be obtained. In these instances, a new image may be requested through the inspection view interface 1000. In some instances, a record of any communication between the user and the adjuster may be documented as an event in the event log of the status pane 1020.

In some instances, if images have not been uploaded, the images pane 1030 may provide a display option for reminding the user to provide the images. Upon selection, a reminder may be sent to the user, such as via the electronic address specified in the original request. In some instances, a new (different) electronic address may be used for the reminder, such as input by the insurance adjuster. Using the inspection view interface 1000, an insurance company's adjusters or other entity's personnel may monitor, track, and review images, including where the images were taken or transmitted from, whether the images have been authenticated, and if not authenticated, the reason(s) why they failed authentication.

Figure 10A:
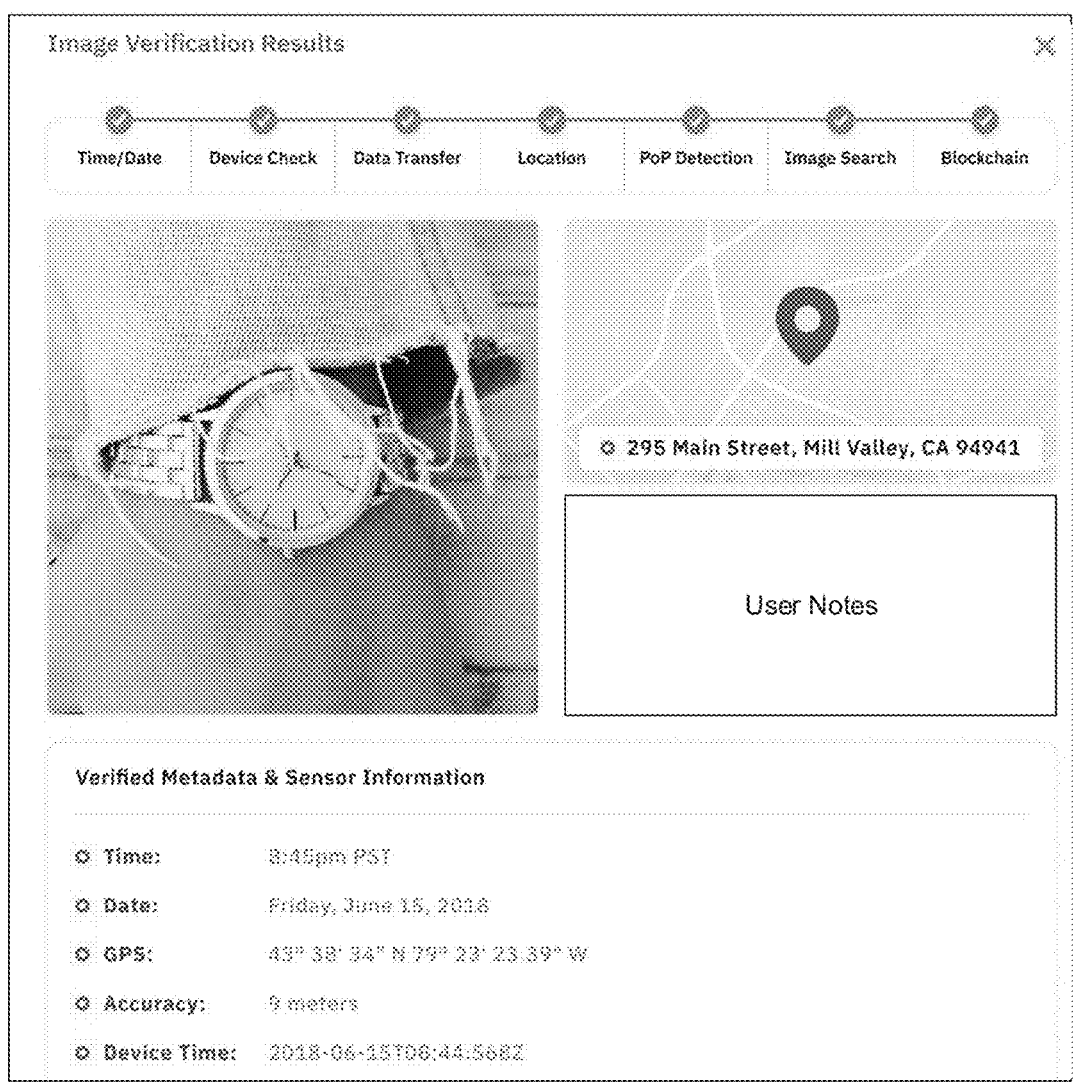
FIG. 10A illustrates a screen shot depiction of an image verification results interface, according to an implementation of the invention.

FIG. 10A illustrates a screen shot depiction of an image verification result interface 1000A, according to an implementation of the invention. The image verification result interface 1000A may be displayed upon user selection of an image from the image pane 1030 of the inspection view interface 1000. The image verification result interface 1000A may provide indicators that depict a result of one or more image verification checks (i.e., authentications). For example, a check mark may indicate the image has failed a corresponding image verification check, while another indicator may indicate the image failed that image verification check. The image verification checks may include, without limitation, a time and date check (e.g., time validations disclosed herein), a device check (which indicates whether or not a device from which the image was provided has been "jailbroken" or otherwise compromised), a data transfer check, a location check (e.g., GPS validations disclosed herein), a picture of a picture ("POP") check that determines whether the image is a picture of another picture based on two-dimensional versus three-dimensional analysis, a reverse image search, a blockchain check (which may indicate that a hash of the image has been successfully written to the blockchain and/or has been validated against a hash written to the blockchain as disclosed herein), and/or other types of checks. An image with a failed verification check may be flagged as such in the status pane 1020. The adjuster may contact the user to explain the issue and/or to request a replacement image.

FIG. 11 illustrates a screen shot depiction of an inspection listing interface 1100 of the interface portal 216 provided by the system, according to an implementation of the invention. The inspection listing interface 1100 may be used to view a listing of inspections for an adjuster. The inspection listing interface 1100 may include an inspection navigation pane 1110 used to select from among open and closed inspections, as well as recently viewed inspections. The inspection navigation pane 1110 may further provide display options to select inspections based on their status, such as whether they are awaiting images from the user, ready for reviewing, and/or other status. The inspection listing interface 1100 may include an inspection detail pane 1120 that provides a detailed listing of inspections. In some instances, the inspection navigation pane 1110 affects content displayed in the inspection detail pane 1120. For example, selection of "ready for review" may cause the inspection detail pane 1120 to display a detailed listing of inspections for which images have been uploaded (and possibly authenticated).

Figure 12A:
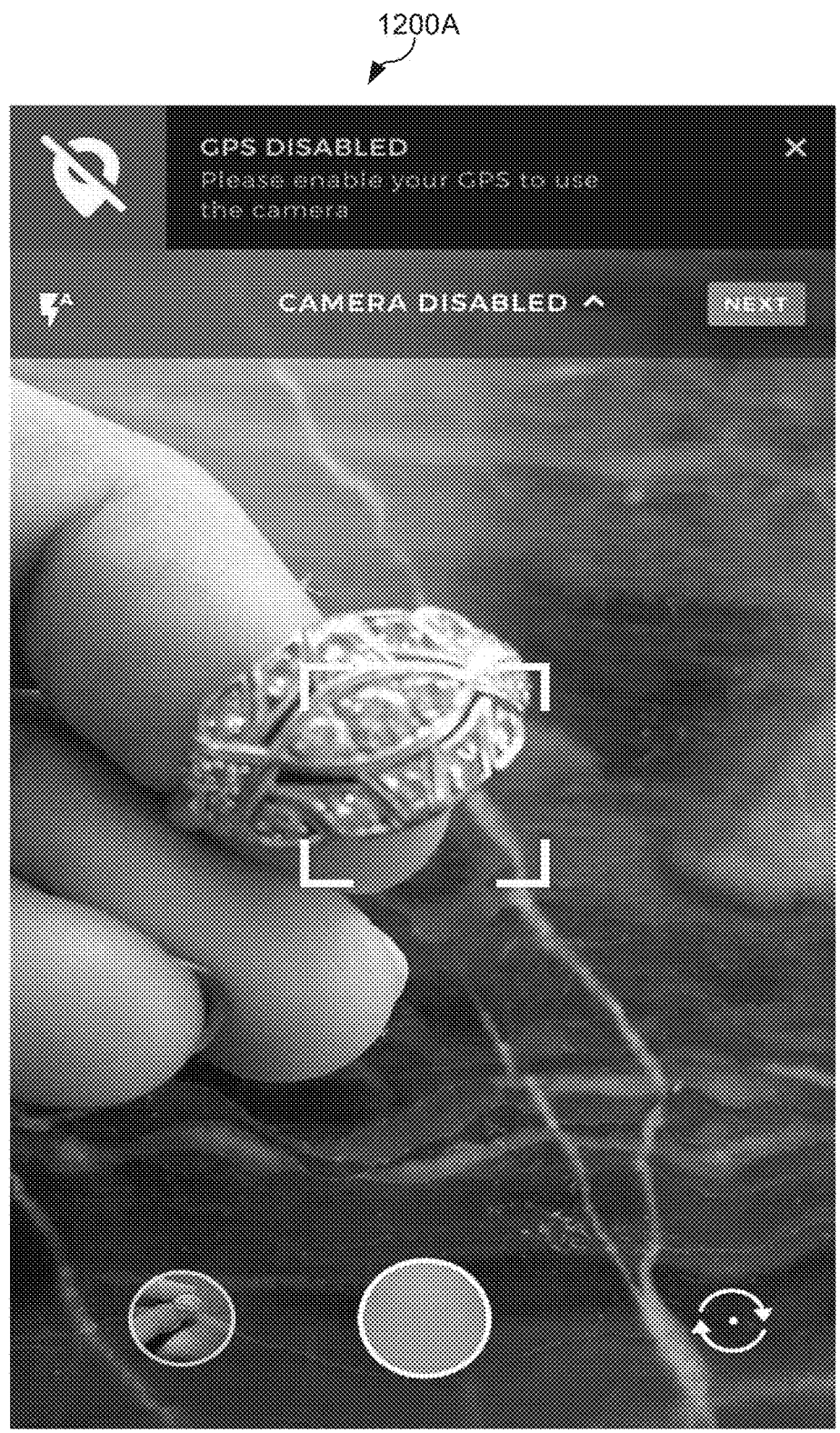
FIG. 12A illustrates a screen shot depiction of an image capture function of the image authentication application of the user device, according to an implementation of the invention.

FIG. 12A illustrates a screen shot depiction 1200A of an image capture function of the image authentication application 101 of the user device 120, according to an implementation of the invention. As previously noted, the image authentication application 101 is a separate application than a native camera application of the user device 120. As such, the image authentication application 101 may provide an image capture function depicted by FIG. 12A. As illustrated, the image capture function may be disabled if certain requirements are not met. For instance, the native location function of the user device 120 may be required to be on so that a location at which the image was take may be detected. Receipt of a selection of the "NEXT" button may provide one or more reasons why the image capture function has been disabled, and provide options to remedy the reasons. For example, by selecting "NEXT" the user may be provide with options to enable the location (e.g., GPS) function of the user device 120. Enablement of the location function and/or other requirements may enable the image capture function, allowing the user to take images and send them to the requester through the image authentication application 101.

Figure 12B:
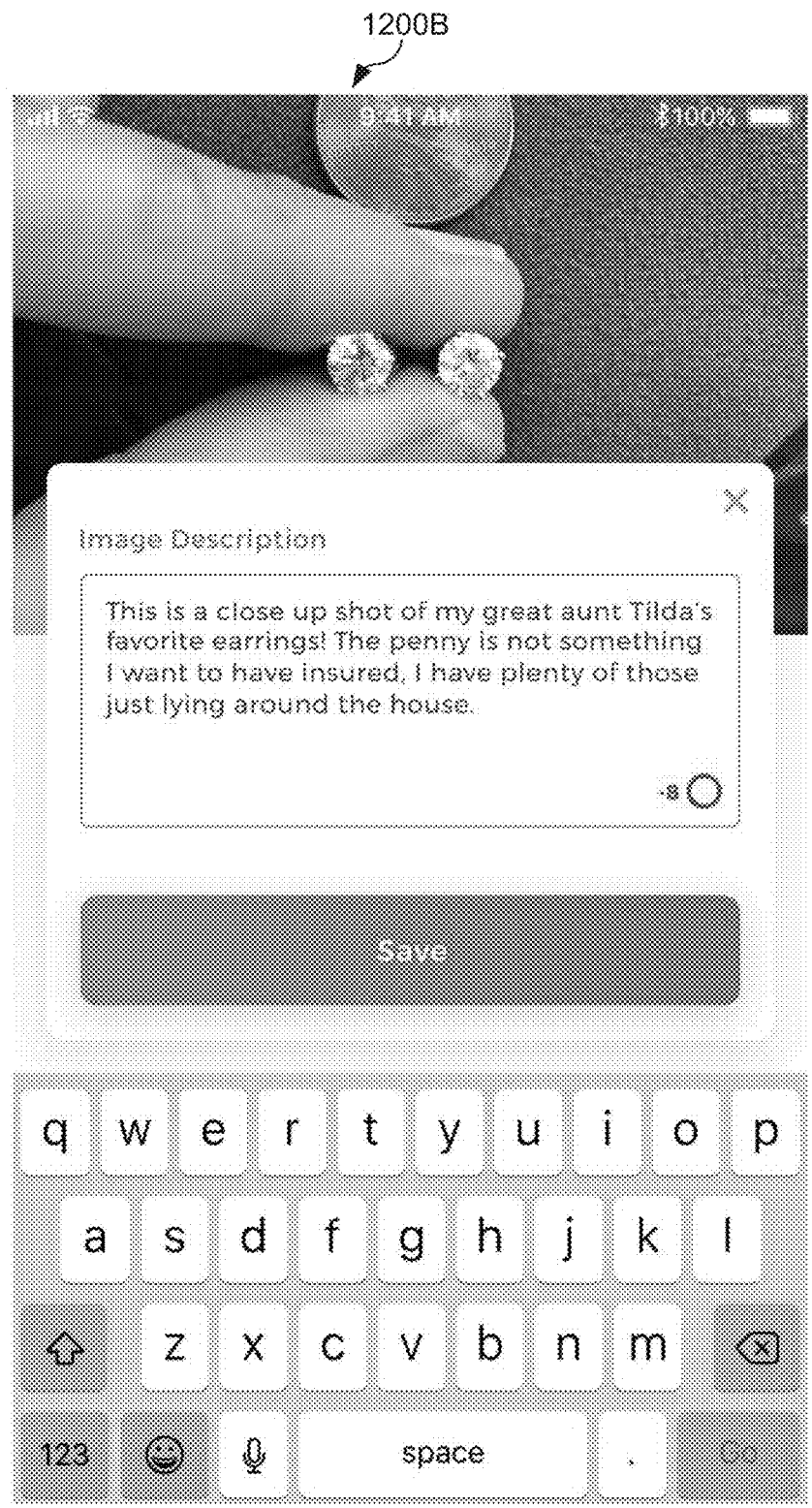
FIG. 12B illustrates a screen shot depiction of an interface of the image authentication application for entering comments, according to an implementation of the invention.

FIG. 12B illustrates a screen shot depiction of an interface 1200B of the image authentication application 101 for entering comments, according to an implementation of the invention. In some instances, after taking a photo or other image using the image capture function illustrated in FIG. 12A, the interface 1200B of the image authentication application 101 may provide an input section for the user provide comments relating to the image. This may provide the requester with information relevant to the photo.

Figure 12C:
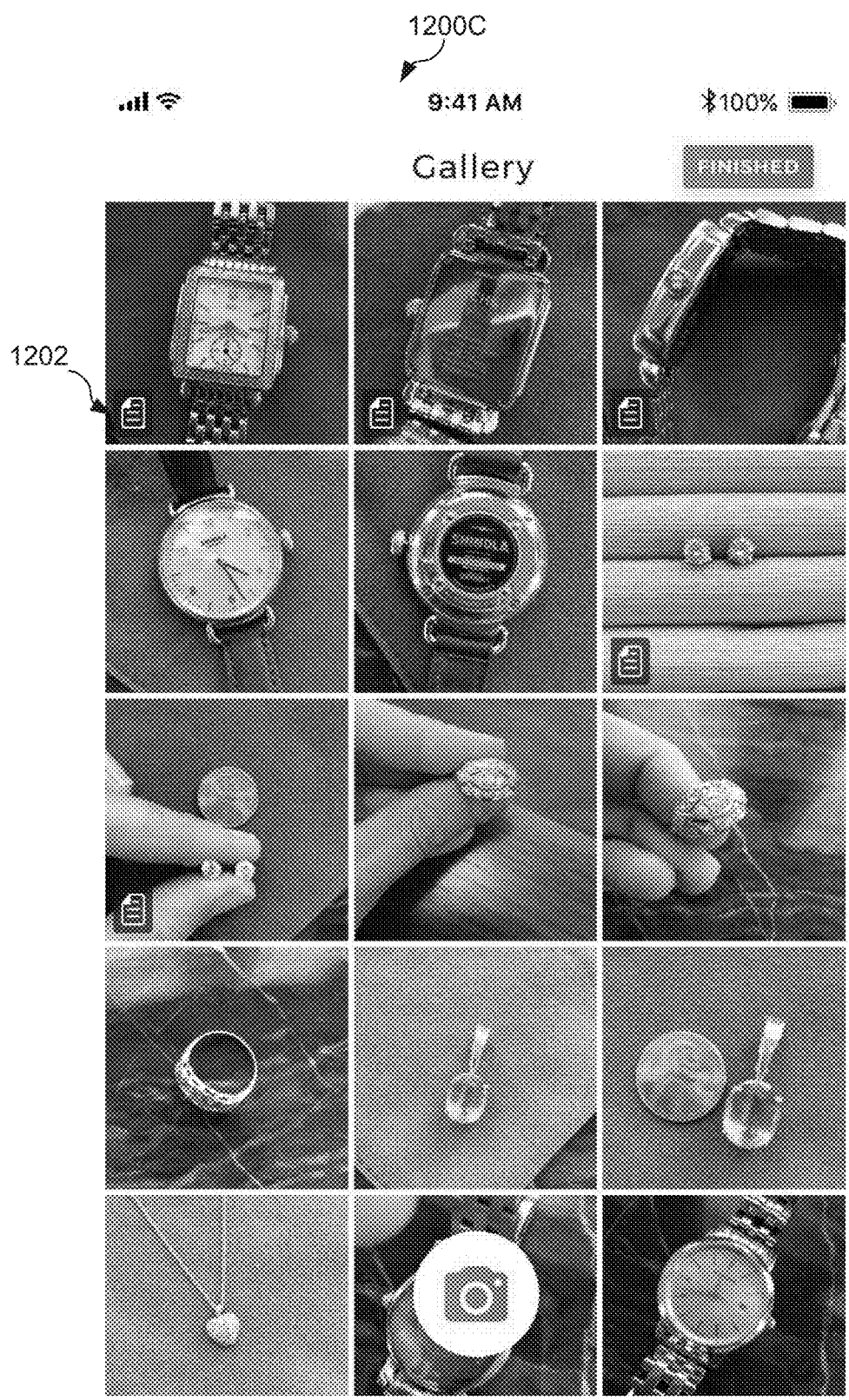
FIG. 12C illustrates a screen shot depiction of a gallery interface of the image authentication application for reviewing a gallery of images taken using the image authentication application, according to an implementation of the invention.

FIG. 12C illustrates a screen shot depiction of a gallery interface 1200C of the image authentication application for reviewing a gallery of images taken using the image authentication application 101, according to an implementation of the invention. The gallery interface 1200C may provide a listing of images that have been captured. The listing may be provided as a series of thumbnails or other depictions. Each image in the gallery interface 1200C may be associated with a comment indicator 1202 if that image has an associated comment provided by the user through the interface 1200B. Images without such comment indicator 1202 may not have any associated comments. Selection of the comment indicator 1202 may return to a display of the interface 1200B for the corresponding image. In some instances, selection of any image in the gallery interface 1200C may return to a display of the interface 1200B for the selected image. Selection of the "FINISHED" button may transmit the images and/or hashes to the requester. Alternatively or additionally, the images and/or hashes may be transmitted to the requester immediately upon capture, immediately upon commenting, and/or at other times.

Figure 13:
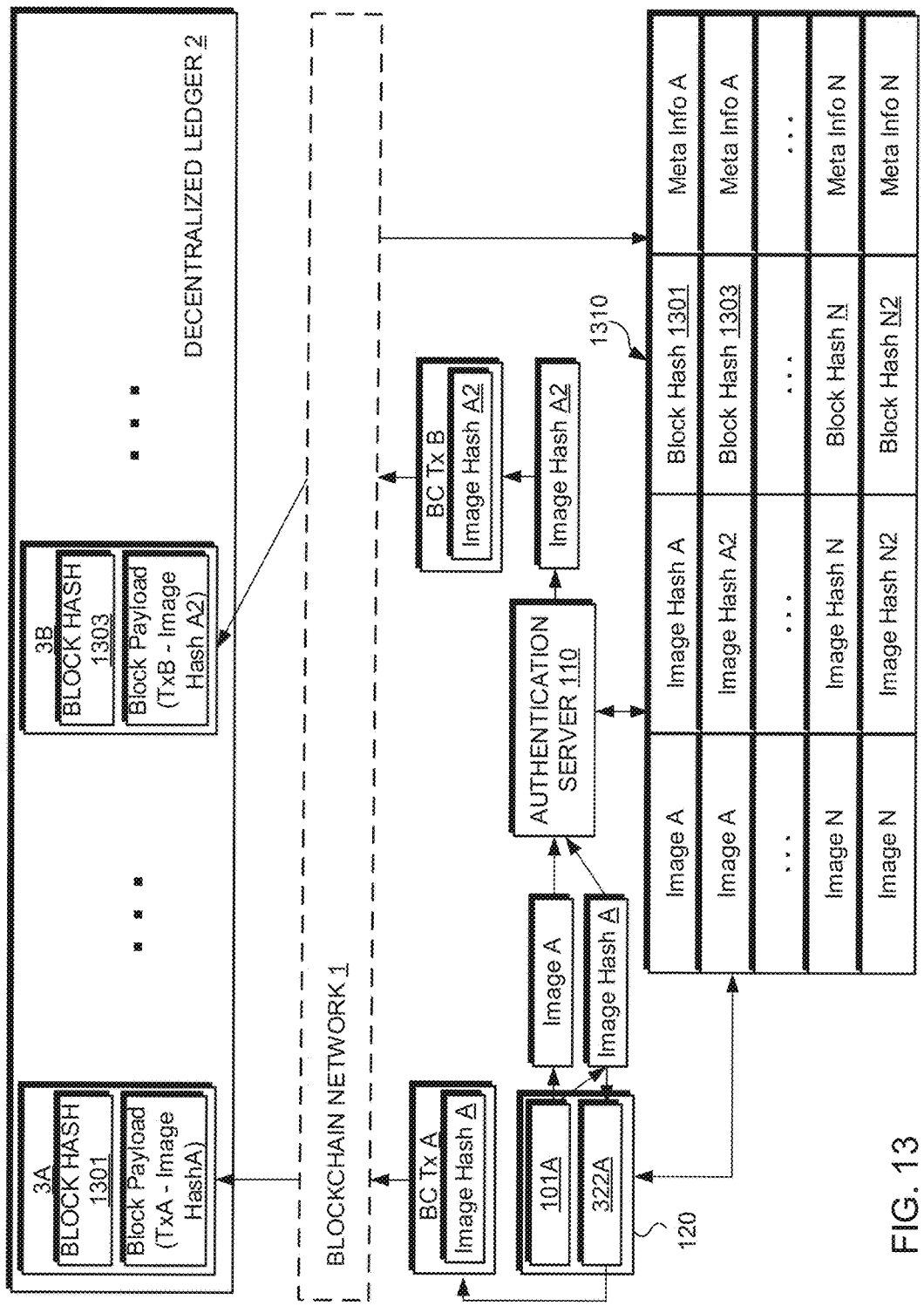
FIG. 13 illustrates a schematic data flow diagram of generating and authenticating electronic photos and other images, generating unique hash signatures of the images at various times from generation of the images to authentication, and writing the unique hash signatures to a decentralized ledger for providing immutable and secure proof of non-tampering of the images from image generation to authentication, according to an implementation of the invention.

FIG. 13 illustrates a schematic data flow diagram 1300 of generating and authenticating electronic photos and other images, generating unique hash signatures of the images at various times from generation of the images to authentication, and writing the unique hash signatures to a decentralized ledger for providing immutable and secure proof of non-tampering of the images from image generation to authentication, according to an implementation of the invention. In an implementation, the image authentication application 101 of the user device 120 may generate an image (Image A) for authentication. In some instances, the image authentication application 101 may generate an image hash (Image Hash A) of the image A using a hash function, such as a one-way hash described herein. The image authentication application 101 may transmit the Image A and/or Image Hash A to the authentication server 110 for authentication. In some instances, the blockchain agent 322A of the user device 120 may generate a blockchain transaction (BC Tx A) containing the Image Hash A (and/or the Image A). The BC Tx A may be written to the blockchain, such as on the decentralized ledger 2 as a block 3A. The block 3A may be identified by a block hash 1301. The block 3A may have a block payload having or referencing the BC Tx A. As such, a record of the Image Hash A and/or the Image A may be recorded on the blockchain that reflects the state of the Image A after it has been generated by the image authentication application 101. In some instances, the blockchain agent 322A may cause the Image Hash A and/or the Image A to be recorded on the blockchain immediately after the image authentication application 101 has generated the Image A.

In some implementations, upon receipt of the Image A, the authentication server 110 may generate an image hash (Image Hash A2) of the Image A using the hashing function (e.g., the same one used by the image authentication application 101). As such, the Image Hash A2 represents the state of the Image A upon receipt at the authentication server 110. The authentication server 110 may generate a blockchain transaction (BC Tx B) containing or referencing the Image Hash A2 and/or the Image A. The authentication server 110 may cause the Image Hash A2 and/or the Image A to be written block 3B of the blockchain. The block 3B is identified by block hash 1303 and hash a payload that includes a block payload that includes or references the Image Hash A2 and/or the Image A. As such, a record of the Image Hash A2 and/or the Image A may be recorded on the blockchain that reflects the state of the Image A after it has been received by the authentication server 110. Although not illustrated, the authentication server 110 may authenticate the image and at various time during and/or after authentication may generate image hashes of the Image A being authenticated. As such, a record of the image hash(es) and/or the Image A may be recorded on the blockchain that reflects the state of the Image A at various time during and/or after authentication of the Image A.

In some implementations, the user device 120 and/or the authentication server 110 may obtain the block hash corresponding to the transactions they each wrote. In this manner, the user device 120 and/or the authentication server 110 may store an association of the Image A, the image hash(es), any metadata associated with the Image A, and/or other data in a data structure 1310. The data structure 1310 permits the user device 110 and/or the authentication server 110 identify which block has corresponding image hashes for a given image. As such, for a given image, its corresponding hash entries stored on the blockchain may be identified and retrieved to ensure that the image hasn't been tampered with from the time the image was generated by the image authentication application 101 through various authentication processes (such as the various verifications disclosed herein).

Figure 14:
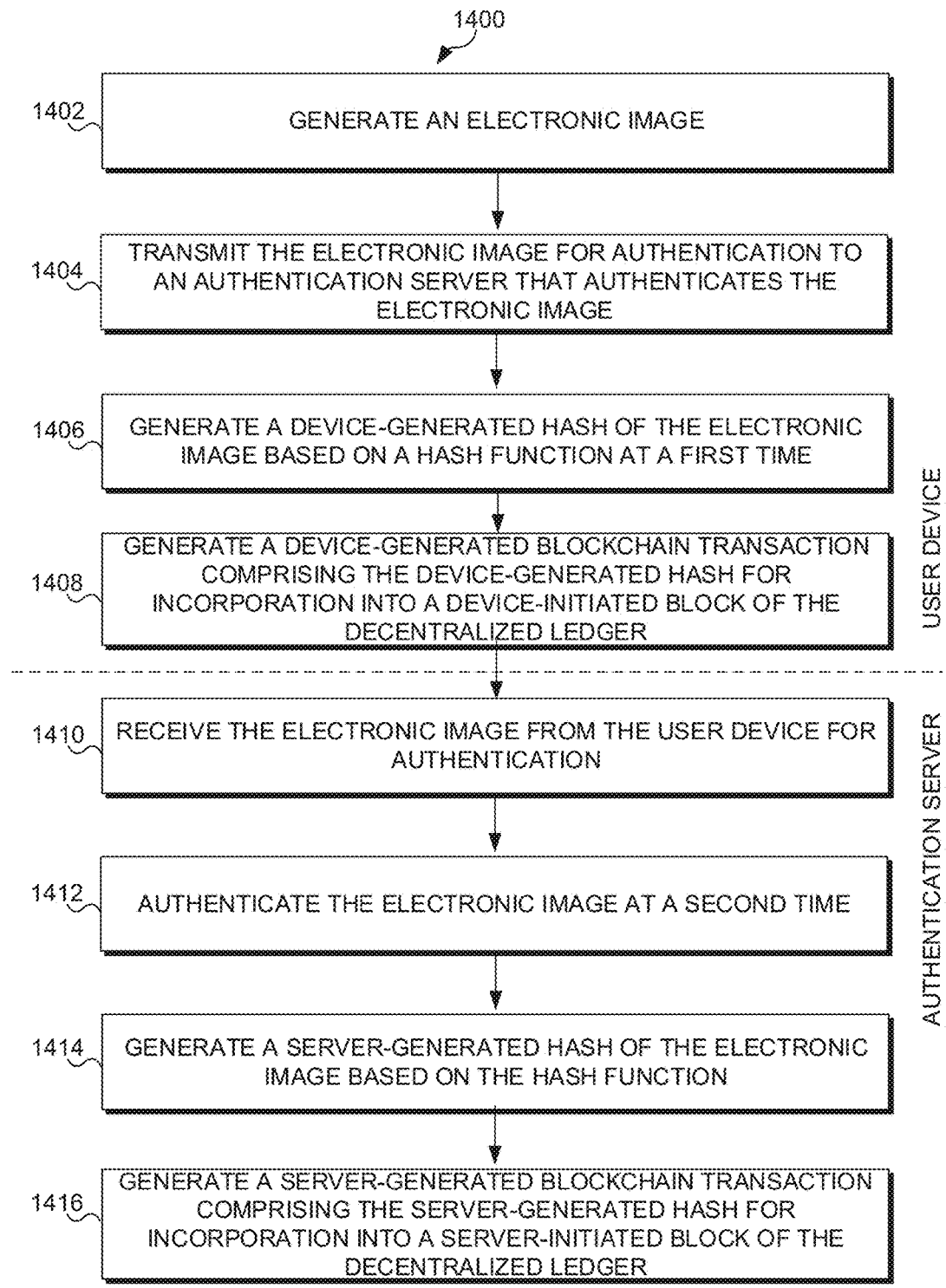
FIG. 14 illustrates an example of a process of generating and authenticating electronic photos and other images, generating unique hash signatures of the images at various times from generation of the images to authentication, and writing the unique hash signatures to a decentralized ledger for providing immutable and secure proof of non-tampering of the images from image generation to authentication, according to an implementation of the invention.

FIG. 14 illustrates an example of a process 1400 of generating and authenticating electronic photos and other images, generating unique hash signatures of the images at various times from generation of the images to authentication, and writing the unique hash signatures to a decentralized ledger for providing immutable and secure proof of non-tampering of the images from image generation to authentication, according to an implementation of the invention.

In an operation 1402, operation 1400 may include generating an electronic image at a first time. For example, the image authentication application 101 of the user device 120 may generate a photo.

In an operation 1404, operation 1400 may include transmitting the electronic image for authentication to the authentication server 110, which authenticates the electronic image. Such authentication may be based on various verification processes described herein.

In an operation 1406, operation 1400 may include generating a device-generated hash of the electronic image based on a hash function. For example, the image authentication application 101 may generate the device-generated hash.

In an operation 1408, operation 1400 may include generating a device-generated blockchain transaction comprising the device-generated hash for incorporation into a device-initiated block of the blockchain, such as the decentralized ledger 102.

In an operation 1410, operation 1400 may include receiving the electronic image from the user device 120 for authentication. For example, the authentication server 110 may receive a photo taken by the image authentication application 101 of the user device 120.

In an operation 1412, operation 1400 may include authenticating the electronic image at a second time (after the first time).

In an operation 1414, operation 1400 may include generating a server-generate hash of the electronic image based on the same hash function used by the image authentication application 101.

In an operation 1416, operation 1400 may include generating a server-generated blockchain transaction comprising the server-generated hash for incorporation into a server-initiated block of the blockchain, such as the decentralized ledger 102. Once process 1400 is complete, an immutable record of the state of the electronic image from at least the time that it was generated to the time it was authenticated may be stored in the blockchain. As such, whether or not an image was tampered with from the time it was generated to the time it was authenticated may be stored in the blockchain.

Figure 15:
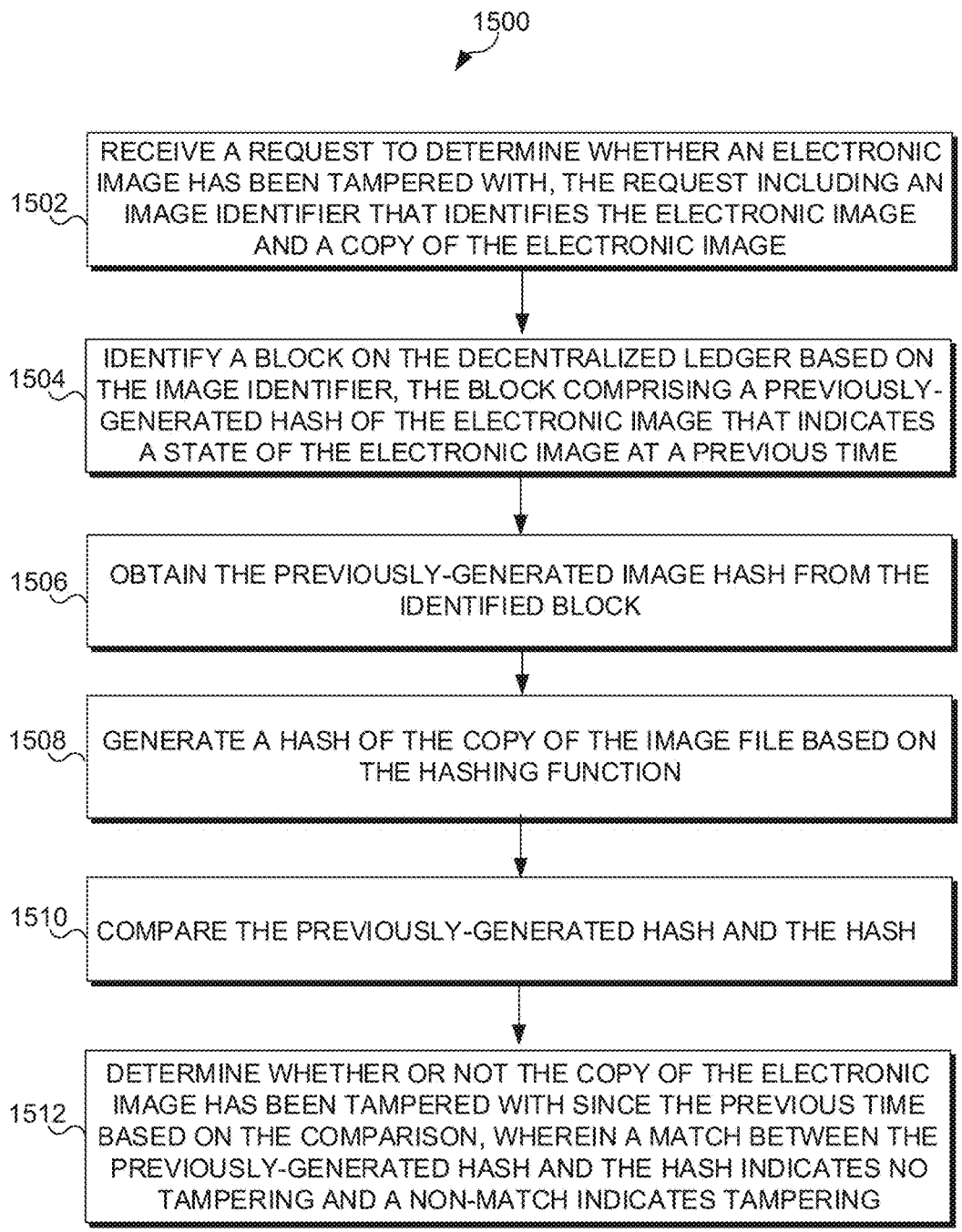
FIG. 15 illustrates an example of a process of determining whether or not an image has been tampered based on image hash entries in a decentralized ledger, according to an implementation of the invention.

FIG. 15 illustrates an example of a process 1500 of determining whether or not an image has been tampered based on image hash entries in a decentralized ledger, according to an implementation of the invention.

In an operation 1502, process 1500 may include receiving a request to determine whether an electronic image has been tampered with. The request may include an image identifier that identifies the electronic image and a copy of the electronic image.

In an operation 1504, process 1500 may include identifying a block on the decentralized ledger 2 based on the image identifier. For example, operation 1504 may consult data structure 1310 to identify a block hash that is associated with a particular image (which may be identified by the identifiers Image A . . . N).

In an operation 1506, process 1500 may include obtaining a previously generated image hash from the identified block. The previously generated image hash may have been generated at various times, such as when the electronic image was created by the image authentication application 101, when the electronic image was received by the authentication server 110 for authentication, at various times throughout the authentication process (including final authentication), and/or at other times. The request may specify which one of these times should be used for comparison. For instance, the request may seek to determine whether the image has been tampered with since the original image was created, uploaded to the authentication server for authentication, at various times throughout authentication, and/or at other times.

In an operation 1508, process 1500 may include generating an image hash of the copy of the electronic image. In an operation 1510, process 1500 may include comparing the generated image hash with the previously-generated image hash. In an operation 1512, process 1500 may include determining whether or not the copy of the electronic image has been tampered with since the previous time based on the comparison. A match indicates no tampering, while a non-match indicates potential tampering (i.e., that the copy of the electronic image is different than the image at the previous time).

Although illustrated in FIG. 1 as a single component, computer system 110 and end user device 120 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 312, 512 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in the figures as being co-located within a single processing unit, in implementations in which processor(s) 312, 512 include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 312, 512 may be programmed by one or more additional instructions that may perform some or all of the functionality attributed herein to one of the instructions.

The various instructions described herein may be stored in a storage device 314, 514, which may comprise random access memory (RAM), read only memory (ROM), and/or other memory. The storage device may store the computer program instructions (e.g., the aforementioned instructions) to be executed by processor 312, 512 as well as data that may be manipulated by processor 312, 512. The electronic storage device may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via the network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

What is claimed is:

1. A system for authenticating electronic images generated at user devices, the system comprising:
   an authentication server comprising one or more physical processors programmed by computer program instructions to:
      receive, from a requesting entity, a request to obtain one or more electronic images to be authenticated, wherein the request includes an electronic address of a user remote from the requesting entity and the authentication server from which to obtain the one or more electronic images;
      obtain a unique identifier associated with the request;
      generate a link to an image authentication application to be downloaded, the link comprising the unique identifier and a network location from which to download the image authentication application;
      transmit a message comprising the link to the electronic address of the user, wherein when selected via a user device of the user, the link causes the image authentication application to be downloaded to the user device;
      receive an electronic image from the image authentication application, wherein the electronic image was generated at the user device via the image authentication application;
      authenticate the electronic image; and
      provide access to the electronic image and an indication of the authentication to the requesting entity.

2. The system of claim 1, wherein the image authentication application is one among multiple applications each customized for one of a set of multiple requesting entities, the set of requesting entities including at least the requesting entity, and wherein the authentication server is further programmed to:
   identify the requesting entity; and
   identify the image authentication application to be downloaded from among the multiple applications based on the identification of the requesting entity.

3. The system of claim 1, wherein to authenticate the electronic image, the authentication server is further programmed to:
   compare the electronic image to a database of electronic images to determine whether the electronic image matches any image from the database of electronic images, wherein no matches supports a conclusion that the electronic image is authentic.

4. The system of claim 3, wherein to compare the electronic image, the authentication server is further programmed to:
   obtain a hash of the electronic image; and
   compare the hash to respective hashes of each image from the database of electronic images.

5. The system of claim 4, wherein the hash is received from the image authentication application or is generated by the authentication server.

6. The system of claim 1, wherein to authenticate the electronic image, the authentication server is further programmed to:
   obtain an expected location of the user;
   obtain a location at which the image authentication application was opened at the user device;
   determine a distance between the expected location and the location at which the image authentication application was opened at the user device; and
   determine whether the electronic image is authentic based on the distance.

7. The system of claim 1, wherein to authenticate the electronic image, the authentication server is further programmed to:
   obtain an expected location of the user;
   obtain a location at which the electronic image was generated;
   determine a distance between the expected location and the location at which the electronic image was generated; and
   determine whether the electronic image is authentic based on the distance.

8. The system of claim 1, wherein the electronic image is received from the image authentication application at a first time, and wherein the authentication server is further programmed to:
   generate a first hash of the electronic image at the first time;
   generate a first transaction comprising the first hash; and
   transmit the first transaction to a blockchain network that writes the first transaction to a decentralized ledger.

9. The system of claim 8, wherein the authentication server is further programmed to:
   generate a second hash of the electronic image after authentication;
   generate a second transaction comprising the second hash; and transmit the second transaction to the blockchain network that writes the second transaction to the decentralized ledger.

10. The system of claim 9, wherein the authentication server is further programmed to:
obtain the first hash and the second hash from the decentralized ledger;
compare the first hash and the second hash; and
determine that the electronic image has not been tampered with based on the comparison.

11. The system of claim 1, wherein responsive to an indication that the image authentication application is already installed on the user device, selection of the link via the user device causes a new session to be initiated associated with the unique identifier, wherein the received electronic image is generated during the new session and is associated with the unique identifier.

12. The system of claim 1, wherein the authentication server is further programmed to:
generate the unique identifier associated with the request, wherein the unique identifier is used to track images and indications of authentication associated with the request.

13. The system of claim 1, wherein the request relates to a first type of inspection and the unique identifier is associated with the first type of request, wherein the authentication server is further programmed to:
obtain parameters specific to the first type of request based on the unique identifier;
cause the parameters to be provided to the image authentication application installed on the user device, wherein the parameters cause instructions for taking specific images associated with the first type of request to be presented via the image authentication application.

14. The system of claim 1, wherein the image authentication application is configured to access a camera of the user device, and wherein the electronic image is captured via the image authentication application using the camera of the user device.

15. A method for authenticating electronic images generated at user devices, the method being implemented by an authentication server having one or more physical processors programmed by to perform the method, the method comprising:
receiving, by the authentication server from a requesting entity, a request to obtain one or more electronic images to be authenticated, wherein the request includes an electronic address of a user remote from the requesting entity and the authentication server from which to obtain the one or more electronic images;
obtaining, by the authentication server, a unique identifier associated with the request;
generating, by the authentication server, a link to an image authentication application to be downloaded, the link comprising the unique identifier and a network location from which to download the image authentication application;
transmitting, by the authentication server, a message comprising the link to the electronic address of the user, wherein when selected via a user device of the user, the link causes the image authentication application to be downloaded to the user device;
receiving, by the authentication server, an electronic image from the image authentication application, wherein the electronic image was generated at the user device via the image authentication application;
authenticating, by the authentication server, the electronic image; and
providing, by the authentication server, access to the electronic image and an indication of the authentication to the requesting entity.

16. The method of claim 15, wherein the image authentication application is one among multiple applications each customized for one of a set of multiple requesting entities, the set of requesting entities including at least the requesting entity, the method further comprising:
identifying, by the authentication server, the requesting entity; and
identifying, by the authentication server, the image authentication application to be downloaded from among the multiple applications based on the identification of the requesting entity.

17. The method of claim 15, wherein authenticating the electronic image comprises:
comparing, by the authentication server, the electronic image to a database of electronic images to determine whether the electronic image matches any image from the database of electronic images, wherein no matches supports a conclusion that the electronic image is authentic.

18. The method of claim 17, wherein comparing the electronic image comprises:
obtaining, by the authentication server, a hash of the electronic image; and
comparing, by the authentication server, the hash to respective hashes of each image from the database of electronic images.

19. The method of claim 18, wherein the hash is received from the image authentication application or is generated by the authentication server.

20. The method of claim 15, wherein authenticating the electronic image comprises:
obtaining, by the authentication server, an expected location of the user;
obtaining, by the authentication server, a location at which the image authentication application was opened at the user device;
determining, by the authentication server, a distance between the expected location and the location at which the image authentication application was opened at the user device; and
determining, by the authentication server, whether the electronic image is authentic based on the distance.

21. The method of claim 15, wherein authenticating the electronic image comprises:
obtaining, by the authentication server, an expected location of the user;
obtaining, by the authentication server, a location at which the electronic image was generated;
determining, by the authentication server, a distance between the expected location and the location at which the electronic image was generated; and
determining, by the authentication server, whether the electronic image is authentic based on the distance.

22. The method of claim 15, wherein the electronic image is received from the image authentication application at a first time, the method further comprising:
generating, by the authentication server, a first hash of the electronic image at the first time;
generating, by the authentication server, a first transaction comprising the first hash; and transmitting, by the authentication server, the first transaction to a blockchain network that writes the first transaction to a decentralized ledger.

23. The method of claim 22, the method further comprising:
generating, by the authentication server, a second hash of the electronic image after authentication;
generating, by the authentication server, second transaction comprising the second hash; and
transmitting, by the authentication server, the second transaction to the blockchain network that writes the second transaction to the decentralized ledger.

24. The method of claim 23, the method further comprising:
obtaining, by the authentication server, the first hash and the second hash from the decentralized ledger;
comparing, by the authentication server, the first hash and the second hash; and
determining, by the authentication server, that the electronic image has not been tampered with based on the comparison.

25. The method of claim 15, wherein responsive to an indication that the image authentication application is already installed on the user device, selection of the link via the user device causes a new session to be initiated associated with the unique identifier, wherein the received electronic image is generated during the new session and is associated with the unique identifier.

26. The method of claim 15, the method further comprising:
generating, by the authentication server, the unique identifier associated with the request, wherein the unique identifier is used to track images and indications of authentication associated with the request.

27. The method of claim 15, wherein the request relates to a first type of inspection and the unique identifier is associated with the first type of request, the method further comprising:
obtaining, by the authentication server, parameters specific to the first type of request based on the unique identifier;
causing, by the authentication server, the parameters to be provided to the image authentication application installed on the user device, wherein the parameters cause instructions for taking specific images associated with the first type of request to be presented via the image authentication application.

28. The method of claim 15, wherein the image authentication application is configured to access a camera of the user device, and wherein the electronic image is captured via the image authentication application using the camera of the user device.

* * * * *